(12) United States Patent
Drost et al.

(10) Patent No.: US 11,788,673 B1
(45) Date of Patent: Oct. 17, 2023

(54) APPARATUS, METHOD, AND SYSTEM FOR FACTORY WIRING, AIMING, AND COMMISSIONING OF CAPTURE DEVICES

(71) Applicant: Musco Corporation, Oskaloosa, IA (US)

(72) Inventors: Matthew D. Drost, Oskaloosa, IA (US); Logan J. Bogatzke, Ottumwa, IA (US)

(73) Assignee: Musco Corporation, Oskaloosa, IA (US)

( * ) Notice: Subject to any disclaimer, the term of this patent is extended or adjusted under 35 U.S.C. 154(b) by 21 days.

(21) Appl. No.: 17/655,498

(22) Filed: Mar. 18, 2022

Related U.S. Application Data

(63) Continuation of application No. 16/705,142, filed on Dec. 5, 2019, now Pat. No. 11,306,861.
(Continued)

(51) Int. Cl.
*G03B 17/56* (2021.01)
*F16M 11/14* (2006.01)
(Continued)

(52) U.S. Cl.
CPC ............ *F16M 11/14* (2013.01); *G03B 17/00* (2013.01); *G03B 17/56* (2013.01);
(Continued)

(58) Field of Classification Search
CPC .................................................... G03B 17/00
(Continued)

(56) References Cited

U.S. PATENT DOCUMENTS

| D113,945 S | 3/1939 | Langbaum |
| 4,320,949 A | 3/1982 | Pagano |
| (Continued) | | |

FOREIGN PATENT DOCUMENTS

| CN | 305981989 | 8/2020 |
| CN | 306480595 | 4/2021 |
| (Continued) | | |

OTHER PUBLICATIONS

Amazon, "Annke FCD600 Dual-Lens Outdoor Security Camera with 180° Fov, 6MP Panoramic PoE IP Camera, Smart Human/Vehicle Detection, Color Night Vision, Two Way Audio, Supports MicroSD Card Up to 256GB," Amazon.com, 2022, Retrieved from Internet: <https://www.amazon.com/ANNKE-Dual-Lens-Security-Panoramic-Detection/dp/B0BB6B49QZ?th=1>, 10 pages.
(Continued)

*Primary Examiner* — Joel W Fosselman
(74) *Attorney, Agent, or Firm* — McKee, Voorhees & Sease, PLC

(57) ABSTRACT

Oftentimes a site owner requires onsite capture devices (e.g., still or video cameras, microphones) for reasons of security, increasing revenue (e.g., streaming content to subscribed users), or otherwise. In the current state of the art various capture devices come from a variety of vendors and are often only adapted to work with software from the same manufacturer. It can be frustrating for a site owner to attempt to cobble together a capture and distribution system from individual parts and devices. Discussed herein is an approach to producing a capture and distribution system customized to an owner's particular needs and a site's particular characteristics in which capture devices are at least partially factory wired, aimed, and commissioned so to reduce both time on site to install of said capture devices and
(Continued)

potential errors in the installation, and in a manner that in at least some cases adds value for the owner.

20 Claims, 22 Drawing Sheets

Related U.S. Application Data

(60) Provisional application No. 62/776,232, filed on Dec. 6, 2018.

(51) Int. Cl.
  *G08B 13/196* (2006.01)
  *G03B 17/00* (2021.01)
  *H04L 67/025* (2022.01)
  *H04L 67/12* (2022.01)
  *G06T 7/70* (2017.01)
  *G06V 10/147* (2022.01)
  *F16M 11/04* (2006.01)

(52) U.S. Cl.
  CPC ...... *G08B 13/19617* (2013.01); *H04L 67/025* (2013.01); *H04L 67/12* (2013.01); *A63B 2220/806* (2013.01); *A63B 2220/807* (2013.01); *F16M 11/04* (2013.01); *G06T 7/70* (2017.01); *G06V 10/147* (2022.01)

(58) Field of Classification Search
  USPC ......................................................... 348/374
  See application file for complete search history.

(56) References Cited

U.S. PATENT DOCUMENTS

| | | | |
|---|---|---|---|
| D294,870 S | 3/1988 | Hsu | |
| 5,099,999 A | 3/1992 | Balien | |
| D335,889 S | 5/1993 | Gibran | |
| D372,203 S | 7/1996 | Sandell et al. | |
| D380,676 S | 7/1997 | Holland | |
| D403,340 S | 12/1998 | Arbuckle | |
| D424,727 S | 5/2000 | Greubel | |
| D425,534 S | 5/2000 | Mutoh et al. | |
| D444,583 S | 7/2001 | Boecker | |
| D501,494 S | 2/2005 | Ogura | |
| D503,183 S | 3/2005 | Arbuckle et al. | |
| D509,527 S | 9/2005 | Murray et al. | |
| D518,080 S | 3/2006 | Uehara | |
| D532,436 S | 11/2006 | Kruse | |
| D536,357 S | 2/2007 | Koby | |
| 7,209,958 B2 | 4/2007 | Crookham et al. | |
| 7,212,706 B2 | 5/2007 | White et al. | |
| D546,997 S | 7/2007 | Monroe et al. | |
| D552,148 S | 10/2007 | Yamakawa | |
| D583,974 S | 12/2008 | Johnson | |
| 7,486,390 B2 | 2/2009 | Suing et al. | |
| D637,639 S | 5/2011 | Park | |
| 8,104,925 B2 | 1/2012 | Gordin | |
| 8,300,219 B1 | 10/2012 | Gordin et al. | |
| 8,405,485 B2 | 3/2013 | Barker et al. | |
| D679,308 S | 4/2013 | Park et al. | |
| 8,624,793 B2 | 1/2014 | Caldwell et al. | |
| D701,893 S | 4/2014 | Bart et al. | |
| 8,717,552 B1 | 5/2014 | Gordin et al. | |
| 8,734,163 B1 * | 5/2014 | Gordin ................. G09B 25/04 434/367 |
| D712,955 S | 9/2014 | Hrbacek | |
| 8,885,016 B2 | 11/2014 | Sasagawa et al. | |
| 9,026,104 B2 | 5/2015 | Crookham et al. | |
| 9,071,767 B2 | 6/2015 | Sasagawa et al. | |
| D745,370 S | 12/2015 | Johnston | |
| D747,383 S | 1/2016 | Li | |
| D781,361 S | 3/2017 | Dimitriadis et al. | |
| D798,361 S | 9/2017 | Kim et al. | |
| D798,935 S | 10/2017 | Dimitriadis et al. | |
| D803,921 S | 11/2017 | Ballard | |
| 9,837,698 B2 | 12/2017 | Lasier et al. | |
| D811,770 S | 3/2018 | Brownley | |
| D816,141 S | 4/2018 | Siminoff et al. | |
| 9,942,639 B2 | 4/2018 | Wright | |
| D834,631 S | 11/2018 | Park | |
| D838,760 S | 1/2019 | Ahman et al. | |
| D841,715 S | 2/2019 | Thompson | |
| 10,199,712 B1 | 2/2019 | Boyle et al. | |
| D842,358 S | 3/2019 | Puric et al. | |
| D849,112 S | 5/2019 | Katori | |
| D850,509 S | 6/2019 | Tsai | |
| D864,277 S | 10/2019 | Siminoff et al. | |
| D870,791 S | 12/2019 | Hasani | |
| D873,887 S | 1/2020 | Rusz et al. | |
| D875,736 S | 2/2020 | Ramones et al. | |
| D878,380 S | 3/2020 | Siminoff et al. | |
| D882,669 S | 4/2020 | Thompson | |
| D902,281 S | 11/2020 | Yang | |
| D902,283 S | 11/2020 | Kao et al. | |
| D905,150 S | 12/2020 | Drost | |
| D939,748 S | 12/2021 | Salihovic et al. | |
| D940,938 S | 1/2022 | Salihovic et al. | |
| 11,306,861 B1 | 4/2022 | Drost et al. | |
| D954,322 S | 6/2022 | Lin | |
| D969,202 S | 11/2022 | Li | |
| 2005/0036036 A1 | 2/2005 | Stevenson et al. | |
| 2013/0268246 A1 | 10/2013 | Gordin | |
| 2018/0033273 A1 | 2/2018 | Siminoff et al. | |
| 2022/0026782 A1 | 1/2022 | Goldburt et al. | |

FOREIGN PATENT DOCUMENTS

| | | |
|---|---|---|
| TW | 189099-0001 | 3/2018 |
| WO | 2008005800 A2 | 1/2008 |

OTHER PUBLICATIONS

Amazon, "Reolink Floodlight Camera, 4K Dual-Lens Wired WiFi Outdoor Security Camera 180° FOV, Smart Human/Vehicle/Pet Detection Siren Alarm, Color Night Vision 2.4G/5GHz, Dual-Band WiFi, Duo Floodlight WiFi," Amazon.com, 2022, Retrieved from Internet <https://www.amazon.com/REOLINK-Floodlight-Dual-Lens-WiFi-Duo/dp/B0BJZYK5BF>, 12 pages.

* cited by examiner

APPARATUS, METHOD, AND SYSTEM FOR FACTORY WIRING, AIMING, AND COMMISSIONING OF CAPTURE DEVICES

CROSS-REFERENCE TO RELATED APPLICATIONS

This application is a continuation application of U.S. application Ser. No. 16/705,142 filed Dec. 5, 2019, which claims priority under 35 U.S.C. § 119 to provisional U.S. application Ser. No. 62/776,232, filed Dec. 6, 2018, all of which is hereby incorporated by reference in their entirety.

I. TECHNICAL FIELD OF INVENTION

The present invention generally relates to factory wiring, aiming, and commissioning of cameras (both still and video), microphones, and other devices (hereinafter "capture devices") so to reduce time on site to install said capture devices and also reduce potential errors in the installation of said capture devices. More specifically, the present invention relates to a capture and distribution system—a system of various capture devices and associated parts specifically designed for a particular site (which are pre-aimed prior to shipment), combined with power and/or communication means (which are pre-commissioned or are otherwise adapted for a new or existing technology platform and/or communication protocol prior to shipment), and optionally, means for adding value to a new or existing facility management system with minimal onsite labor.

II. BACKGROUND OF THE INVENTION

For a number of reasons owners of a site often require onsite capture devices. Perhaps security is an issue, and so video cameras strategically placed and aimed are needed. Perhaps a venue owner is trying to increase revenue by recording images, video, and/or sound relating to an event for live and/or later viewing (e.g., streaming content to subscribed users). Regardless of the motivation, the state of the art suffers because various capture devices such as microphones, cameras, and the like come from a variety of vendors. Many devices are only adapted to work with software from the same manufacturer. Oftentimes a site owner is at a loss because there is no local company capable of all the steps needed to create a functional system; namely, wiring the capture devices, mounting the devices, aiming the devices, and commissioning the devices such that they "talk" to onsite facility management systems. It can be frustrating for a site owner to attempt to cobble together a capture and distribution system from individual parts and devices from individual vendors.

While it does not appear as if there is or will soon be a single source vendor that can supply all components for a capture and distribution system while also having personnel skilled in installation, aiming, and commissioning across all sites and geographic locations, more can be done to improve the state of the art. Even if parts and devices are sourced in a traditional manner, a site owner may greatly benefit from having said parts and devices wired, aimed, and commissioned prior to installation—and in a manner reflective of that owner's particular needs and the site's particular characteristics—such that an owner has very little to do post-installation to use said capture and distribution system in the manner desired. Thus, there is room for improvement in the art.

III. SUMMARY OF THE INVENTION

In the current state of the art, capture devices installed at a site (indoor or outdoor) must be installed by hand, one by one, and commissioned in a similar fashion. This can lead to variability in site installations of capture and distribution systems. Further, capture devices from different manufacturers may only be compatible with certain software, and said software may not be compatible with existing facility management systems that control other aspects of a site (e.g., lighting, temperature, motion sensors, weather sensors, etc.). This can lead to a reduced benefit or perceived value of some capture devices.

It is therefore a principle object, feature, advantage, or aspect of the present invention to improve over the state of the art and/or address problems, issues, or deficiencies in the art.

One way to reduce variability, as well as onsite labor and potential for onsite installation error, is to pre-wire, pre-aim, and pre-commission capture devices prior to shipment. Even if capture devices are sourced from different manufacturers, factory wiring, aiming, and commissioning ensures a system is delivered to an owner rather than individual parts and devices which an owner must piece together and make sense of to ensure desired functionality. Envisioned are apparatus and methods for providing such a commissioned system.

Further, each site for which capture devices are being considered has particular characteristics (e.g., topology, site power, internet connectivity), and each owner has particular needs (e.g., number of capture devices, number and layout of venues at a site). Envisioned are apparatus and methods to evaluate a site and an owner's needs to determine appropriate mounting heights, aiming angles, etc., such that said commissioned capture and distribution system is customized for each site/owner. Further objects, features, advantages, or aspects of the present invention may include one or more of the following:

a. apparatus and methods for wiring and aiming capture devices in a factory setting based upon input from a site characterization;
b. apparatus and methods to compensate for variability in capture device construction;
c. apparatus and methods to connect pre-wired, pre-aimed, and pre-commissioned capture devices to a new or existing network;
d. apparatus and methods to conceal devices, power means, and/or communication means; and
e. apparatus and methods to facilitate onsite or offsite access by a user so to facilitate viewing and/or distribution of content sourced from said capture devices.

These and other objects, features, advantages, or aspects of the present invention will become more apparent with reference to the accompanying specification and claims.

IV. BRIEF DESCRIPTION OF THE DRAWINGS

From time-to-time in this description reference will be taken to the drawings which are identified by figure number and are summarized below.

FIGS. 1-8 illustrate various views of a first embodiment according to aspects of the present invention; here using a wired configuration. FIG. 1 illustrates a top front perspective view, FIG. 2 illustrates a front view, FIG. 3 illustrates a back view, FIG. 4 illustrates a right side view, FIG. 5 illustrates a left side view, FIG. 6 illustrates a top view, FIG. 7 illustrates a bottom view, and FIG. 8 illustrates a bottom front perspective view; note that for clarity, some internal components have been removed from FIG. 8.

FIG. 9 illustrates an exploded perspective view of the first embodiment of FIGS. 1-8 detailing the external components and sealing/water shedding devices; note that for clarity, all electrical connections and some fastening devices have been removed, and only some internal components are illustrated in broken line (for spatial context).

FIGS. 10A and B illustrate various views of the internal components of the first embodiment of FIGS. 1-8. FIG. 10A illustrates the capture devices (here, a microphone and camera) at least partially pre-aimed and positionally affixed in an apparatus which (i) is at least partially contained within the internal space formed by the external components of the first embodiment of FIGS. 1-8, and (ii) interfaces with the external components of the first embodiment of FIGS. 1-8. FIG. 10B illustrates in isolation said apparatus.

FIG. 11 illustrates an exploded perspective view of the first embodiment of FIGS. 1-8 detailing the internal components; note that for clarity, all electrical connections, sealing devices, and some fastening devices have been removed, and only some external components are illustrated in broken line (for spatial context).

FIGS. 12A and B illustrate an alternative embodiment according to aspects of the present invention; here using a wireless configuration. FIG. 12A illustrates a top front perspective view and FIG. 12B illustrates an enlarged, isolated perspective view of the concealed power and/or communication portion of the alternative embodiment; note that for clarity, all electrical connections, fastening devices, and front and back clamshells have been removed from FIG. 12B.

FIGS. 13A and B illustrate an alternative embodiment according to aspects of the present invention; here using a cellular configuration. FIG. 13A illustrates a top front perspective view and FIG. 13B illustrates an enlarged, isolated perspective view of the capture device portion; note that for clarity, the top cover has been removed in FIG. 13B.

FIGS. 17A-D illustrate different possible mounting structures for portions of the capture and distribution system according to aspects of the present invention; here, a free-standing structure (FIG. 17A), a bracketing system (FIG. 17B) to connect to, e.g., a baseball backstop, a bracketing system (FIG. 17C) to connect to, e.g., a mesh net, and a bracket/weldment (FIG. 17D) to connect to a metal pole or other elevating structure.

Figure 18A:
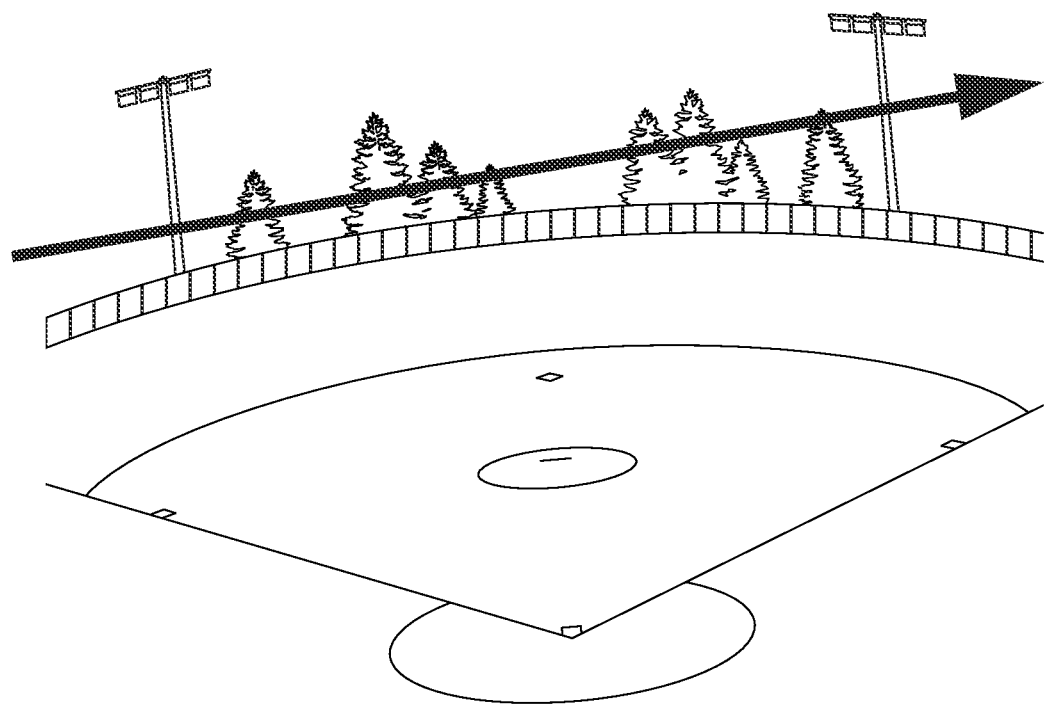

FIGS. 18A and B illustrate an example of incorrect aiming due to, e.g., variability in capture device construction (FIG. 18A), and correction of aiming (FIG. 18B) from either on site (e.g., via access point) or off site (e.g., via factory correction).

Figure 19:
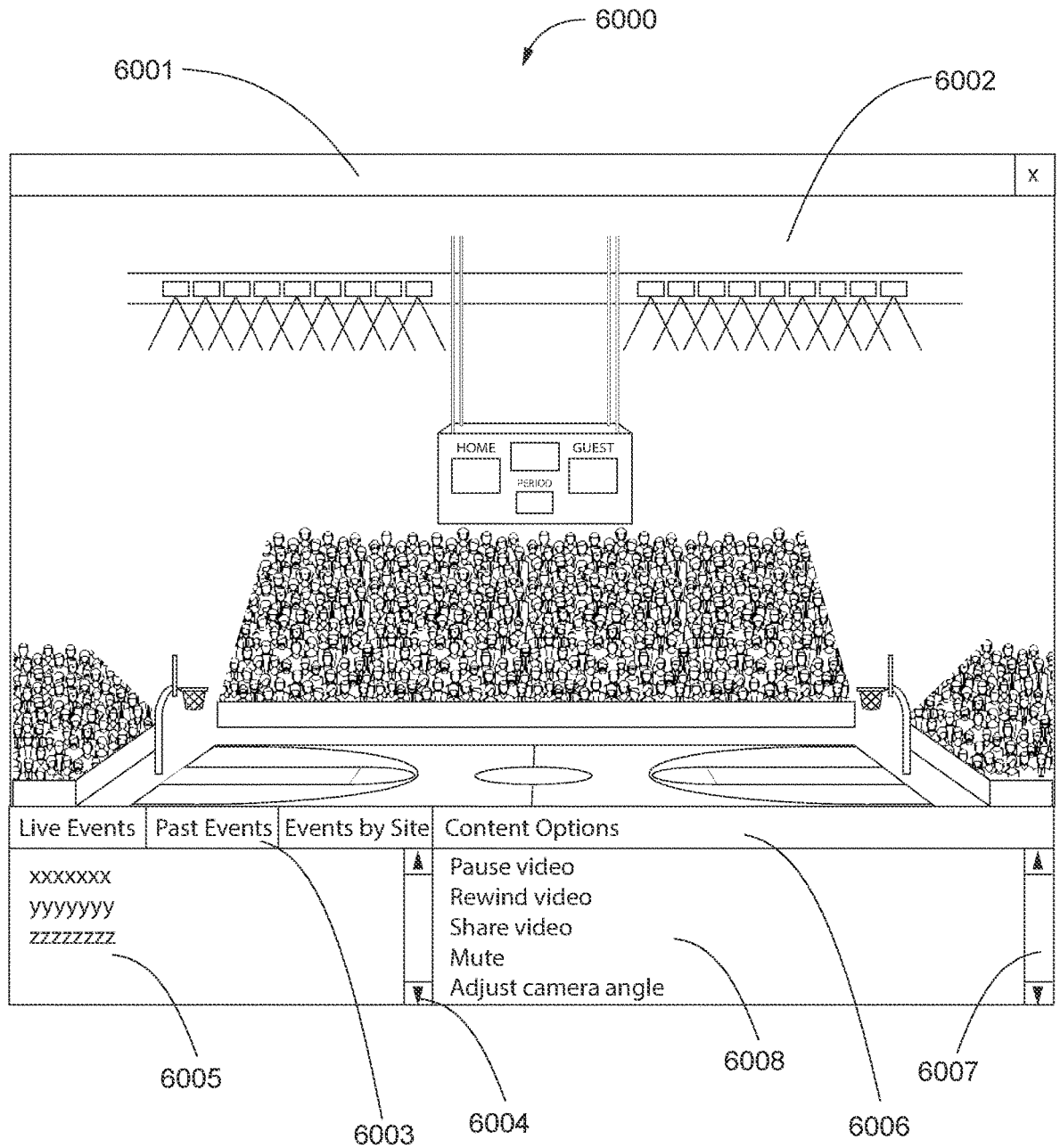

FIG. 19 illustrates one possible user interface associated with a website to which commissioned devices transmit content associated with a site or an event at a site, and by which a user may exert some kind of oversight or control over said site or an event at said site.

V. DETAILED DESCRIPTION OF EXEMPLARY EMBODIMENTS

A. Overview

To further an understanding of the present invention, specific exemplary embodiments according to the present invention will be described in detail. Frequent mention will be made in this description to the drawings. Reference numbers will be used to indicate certain parts in the drawings. Unless otherwise stated, the same reference numbers will be used to indicate the same parts throughout the drawings. Regarding terminology, various broad terms such as "device", "part", "portion", "component", "subassembly", "apparatus", "assembly", and "means" may be used to describe a number of elements that may operate in isolation, but may also operate as part of a larger whole. These terms are used by way of convenience and no functional or structural limitation should be imparted via use of these terms aside from those explicitly stated herein. Likewise, broad terms such as "site" and "event" and "venue" may be used by way of convenience to describe an area, angle, location, or time of interest; these terms should not be considered limiting in how or where the invention may be practiced. Likewise, the use of broad terms like "owner" or "user" may be used by way of convenience to describe a party of interest; these terms should not be considered limiting in who may practice the invention. Lastly, the term "talk" may be used to describe a portion of the commissioning process; this term should not be considered limiting regarding particular means and methods of transmitting signals, instructions, data packets, information, etc. in a manner that can be received and processed or otherwise acted upon.

With reference to more specific terminology, reference is given herein to "capture devices"—this term is intended to encompass any number of devices (including connections, power means, communication means, etc.) capable of transmitting (e.g., live streaming, recording) content (e.g., video, images, sound) associated with a site or an event at a site. Unless otherwise explicitly stated herein, it is not necessary for a capture device to record and/or store content, nor is a capture device restricted to a particular type of content, file format, communication protocol, connection means, power means, or technology platform. Also, reference is given herein to "facility management systems"—this term is intended to encompass any device, network, or means or combination thereof which enables a user to exert some kind of oversight or control over a site or an event at a site. For example, a facility management system may be as simple as a monitor which displays live video from a video camera mounted and aimed at a site—even if the video is not recorded and even if a user cannot interact with the camera or the video via the monitor. Alternatively, a facility management system may be as complex as the CONTROL-LINK® control system and scheduling service provided by Musco Sports Lighting, LLC; see U.S. Pat. Nos. 9,026,104 and 7,209,958 incorporated by reference herein. Either of the aforementioned, or any facility management system of interposing complexity, is possible, and envisioned.

Further regarding more specific terminology, reference is given herein to a "capture and distribution system"—this term is intended to encompass any number of capture devices just defined, in combination with any type of facility management system just defined; or instead, or in addition to, any number of capture devices just defined in combination with cloud-based storage, local storage, a local network, or some sort of functionality which has the potential to add value for a user. For example, a capture and distribution system could include a number of mounted and aimed cameras which record video during nighttime hours at a venue, and means to transmit to and store said recorded video on a cloud-based storage system. In this example a user could access the cloud-based storage system (e.g., from a phone or computer) and have instant access to indexed and time-stamped video content—thus having added value beyond simply having the capture devices. This is but one example of added value provided by a capture and distribution system (as opposed to individual parts and devices which an owner must piece together); other benefits according to aspects of the present invention are possible, and envisioned.

The exemplary embodiments envision one or more enclosures, each enclosure being modular to allow for onsite access (e.g., to provide for adjustments to capture devices due to unexpected changes in site conditions) yet enclose/conceal devices (e.g., to protect against weather and theft). Each of said enclosures includes one or more capture devices, power means, communication means, or the like. Each enclosure having a capture device which requires onsite aiming (e.g., cameras) includes a laser assembly—for example, such as that described in U.S. Pat. No. 8,104,925 or U.S. Publication No. 2013/0268246, both of which are incorporated by reference herein—which is used to orient the aforementioned capture devices in situ after being pre-aimed in a factory setting. This aids in reducing installation error because the laser is set at a known aiming angle prior to shipment, and can be oriented to a known feature determined during the site characterization.

The precise number and type of capture devices, modular enclosures, and associated mounting structures is dependent upon an owner's particular needs and a site's particular characteristics—which are determined in accordance with a site characterization conducted prior to wiring, aiming, and commissioning of the capture and distribution system. If said site characterization reveals an existing facility management system, desired technology platform, available internet connection speed, or the like, the step of commissioning the capture and distribution system in a factory setting (or otherwise prior to installation) may be expanded to provide added value for the user in a manner that requires minimal onsite labor. For example, it is well known in the art that commissioning of devices is difficult to do on site—each device has multiple settings and the noise, wind, or other characteristics of an actual site make it burdensome to sort out said settings in situ. Above and beyond such things as determining IP addresses, setting contrast and frame rate of cameras, setting resolution of devices, etc. in a factory setting prior to shipment, one possible method of adding value may comprise commissioning each device in the factory to "talk" to a particular device, network, website, or other access point, and creating credentials to allow a user both onsite and offsite access to said device, network, website, or other access point so to, e.g., monitor device activity.

As envisioned, once pre-wiring, pre-aiming, and pre-commissioning is complete (here, "pre-" refers to at least partial completion in a factory-type setting or otherwise not on site), the capture and distribution system is shipped to the site and installed with site-specific mounting structure(s), some specific examples of which are later discussed. A final alignment is completed by orienting a laser from each aforementioned laser assembly to point to a site feature (e.g., following a process such as that described in U.S. Pat. No. 8,717,552 incorporated by reference herein), final power connections are made and concealed in either the enclosures or the site-specific mounting structures, and any final commissioning and/or user training is provided. As an example of the latter, the owner could be provided with the aforementioned credentials and walked through how to access said device, network, website, or other access point and/or content from said capture devices on the device, network, website, or other access point. The end result is a customized capture and distribution system having reduced onsite installation time and reduced potential for installation errors.

A more specific exemplary embodiment, utilizing aspects of the generalized example described above, will now be described.

B. Exemplary Apparatus Embodiment 1

FIGS. 1-11 illustrate one possible design of capture and distribution system according to aspects of the present invention; here, including microphone and camera capture devices, and in a wired configuration (e.g., for networking, power means, communication means). Capture and distribution system 100 generally includes a housing subassembly 200, internal positioning subassembly 900, microphone subassembly 300, camera subassembly 400, and laser aiming subassembly 600 the details of which are presently discussed.

As can be seen from the aforementioned figures, housing subassembly 200 comprises front 201 and back clamshells 203 which are removably affixed to strengthening ribs 210 via fastening devices 408. Strengthening ribs 210 are keyed on the top and bottom so to position said ribs (and by extension, front and back clamshells 201, 203) relative top 204 and bottom 205 plates (see FIGS. 6 and 9). The combination of parts 201, 203, 204, 205, and 210 collectively define an internal space to house capture devices (here, subassemblies 300, 400, 600, and 900).

If the site or venue is outdoors or otherwise subject to environmental effects such as moisture, housing subassembly 200 may optionally include gaskets 218 and/or foam tape 209 (e.g., for sealing), and rain lip 208 and/or slot 202 (e.g., for water shedding), to protect said capture devices. Further, if capture and distribution system 100 is at a location (see FIG. 16) where it may be struck by, e.g., an object in flight, it may be desirable to form portions 201, 203 from a corrosion resistant material (e.g., powder coated aluminum alloy) of sufficient thickness (e.g., 0.80") to absorb impacts. In practice, the precise construction of capture and distribution system 100 will depend upon the needs of the user and a site characterization (later discussed).

Top plate 204 includes a number of apertures that are either plugged (see reference no. 217), or are used for capture device functionality (see, e.g., Embodiment 3). Some fastening devices 216 (e.g., those near the outer perimeter) are inserted through apertures in top plate 204 such that threads project up and out (see FIGS. 1)—this permits stacking of multiple modular enclosures insomuch that a bottom plate 205 of one modular enclosure may be stacked on top of the top plate 204 of another modular enclosure and the two enclosures joined and positionally affixed via fastening devices 216 which extend through both top plate 204 and apertures 213 in bottom plate 205.

In this sense, a single capture and distribution system 100 could include one or more modular enclosures depending on the needs of the user or characteristics of a site. For example, note that apertures 213 are arcuate in shape to allow a range of horizontal rotation about pivot axis 1000—this could permit angular offset of stacked enclosures to provide 360 degree coverage by capture devices (which may be needed, e.g., if a system 100 is installed between sports fields). In this example, plugs 217 in a lower enclosure would be removed and wiring (e.g., CAT5e cable, 120VAC power line) from capture devices in a higher enclosure routed through apertures 219 of its bottom plate 205, through unplugged apertures in the top plate 204 of the next lower enclosure, and so on until all wiring is routed to its destination (e.g., electrical panel).

With respect to the capture devices contained in the internal space formed by housing subassembly 200, the number, type, and orientation can vary from site to site, or even from enclosure to enclosure within a system stack. By way of example and not by way of limitation, the present embodiment illustrates a single microphone subassembly 300 and a single camera subassembly 400 colocated and located relative to housing subassembly 200 via internal positioning subassembly 900. As can be seen from FIGS. 10A-11, subassembly 900 is affixed to housing subassembly 200 via fastening devices 216 (which can be press-in captive studs and powder coated or painted over to ensure a watertight seal) which run in opposition fashion from fastening devices near the outer perimeter, and extend through yoke 401 and top plate 204. Also affixed to yoke 401 (e.g., via fastening devices 403) is a portion 412 having an angle and an aperture sized to accommodate a microphone 301 (e.g., model ML1-U-PM available from Electronic Technical Services, Inc., Albuquerque, N. Mex., USA) of microphone subassembly 300. Microphone subassembly 300 further includes a faceplate 303 (which can be removable or welded to portion 201) with an angled section 302 having an aperture 305 complementary to the aperture in portion 412. Here, said complementary apertures aim microphone 301 down 20 from horizontal, though this is by way of example and not by way of limitation.

Internal positioning subassembly 900 further includes portion 402 which is affixed (e.g., via fastening devices 403) to yoke 401, portion 402 being removably affixed to portion 405 (e.g., via fastening devices 406 in arcuate apertures 409). Portion 405 forms a part of camera subassembly 400, which also includes a camera 404 (e.g., model Q3515-LVE available from Axis Communications AB, Lund, Sweden) and an Ethernet pass-through 413 (e.g., model PP-RJ-RJ available from Phoenix Contact Pvt. Ltd., New Delhi, India). Lastly, internal positioning subassembly 900 includes a setscrew subassembly 407 mounted in yoke 401; here, including two spring-loaded pins with a center threaded rod both ends of which have a washer/nut combination that can be tightened or loosened from either side (see points A and B of FIG. 10B).

In practice, capture devices can be accessed from the front or back of capture and distribution system 100 so to address a variety of site restrictions (e.g., a system mounted to a backstop at a baseball field may only be accessible from the front after installation), and because capture devices are colocated (see, e.g., apertures 305 and 304 for microphone 301 and camera 404, respectively) installation error is reduced—because aiming of one device automatically aims the other(s). According to the present embodiment aiming of camera 404 via laser aiming assembly 600 (later discussed—see Embodiment 2) automatically aims microphone 301.

Said aiming can be achieved in one, two, or three axes at least partially in a factory setting. For example, it has already been stated how aiming in a horizontal plane (pivot axis 1000, FIG. 7) is achieved. Aiming in a vertical plane (pivot axis 2000, FIGS. 4 and 5) is achieved by selective tightening of the nut(s) of setscrew subassembly 407 at points A and/or B. Aiming in a third plane (pivot axis 3000, FIG. 2) so to provide rotational pivoting (e.g., to rotate camera 404 in situ so to align the field of view with a geographical feature or horizon—see FIGS. 18A and B) is provided by gripping tabs of parts 405 and 402 (see points C and D of FIG. 10B, respectively) and adjusting plate 405 (e.g., by loosening fastening devices 406 and then tightening in arcuate slot 409 when a desired rotation is achieved). At least some of the aforementioned aiming, or in some cases re-aiming (an example of which is later discussed), could be done on site or otherwise after installation, if desired.

C. Exemplary Apparatus Embodiment 2

Figure 1:
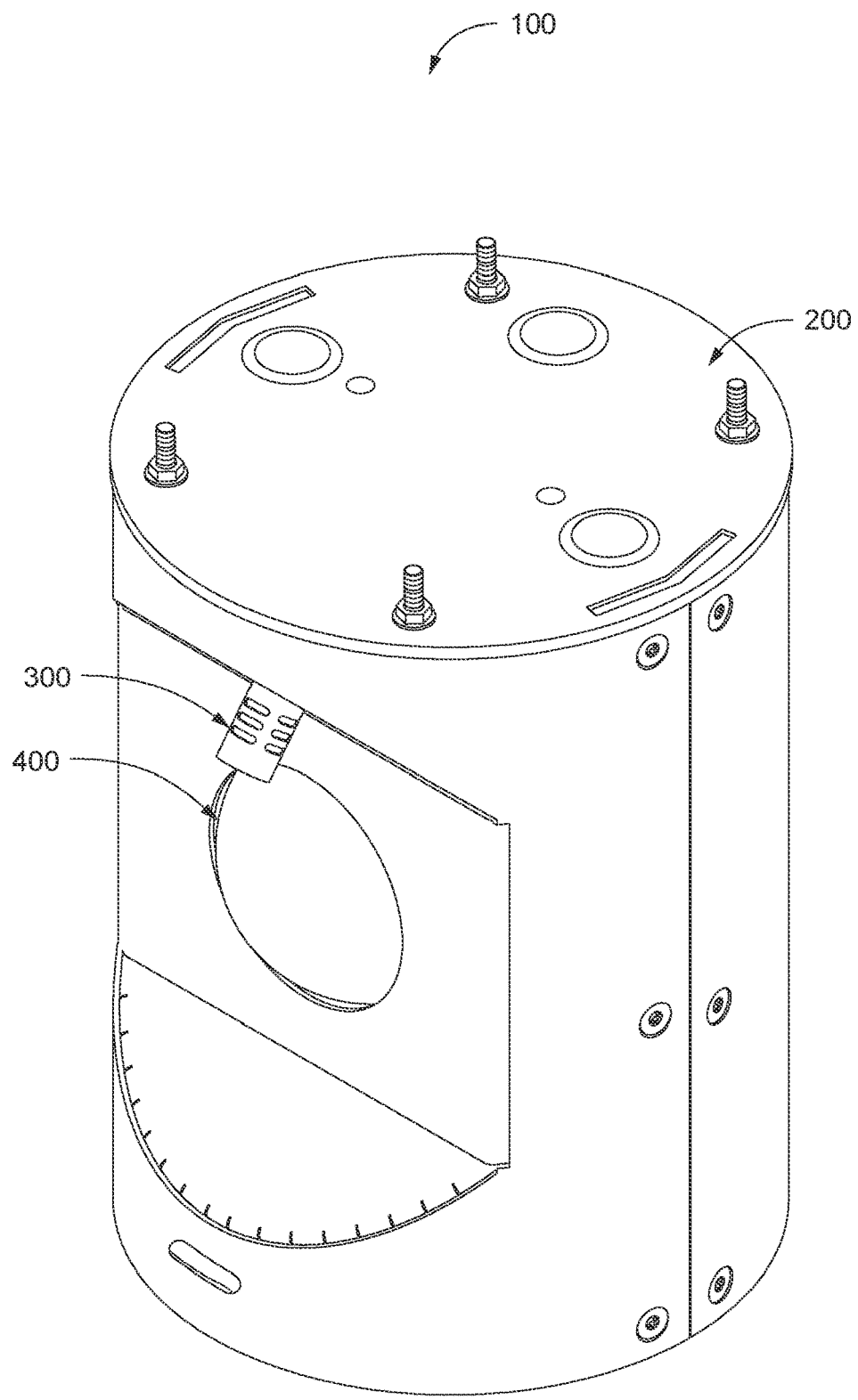
Figure 2:
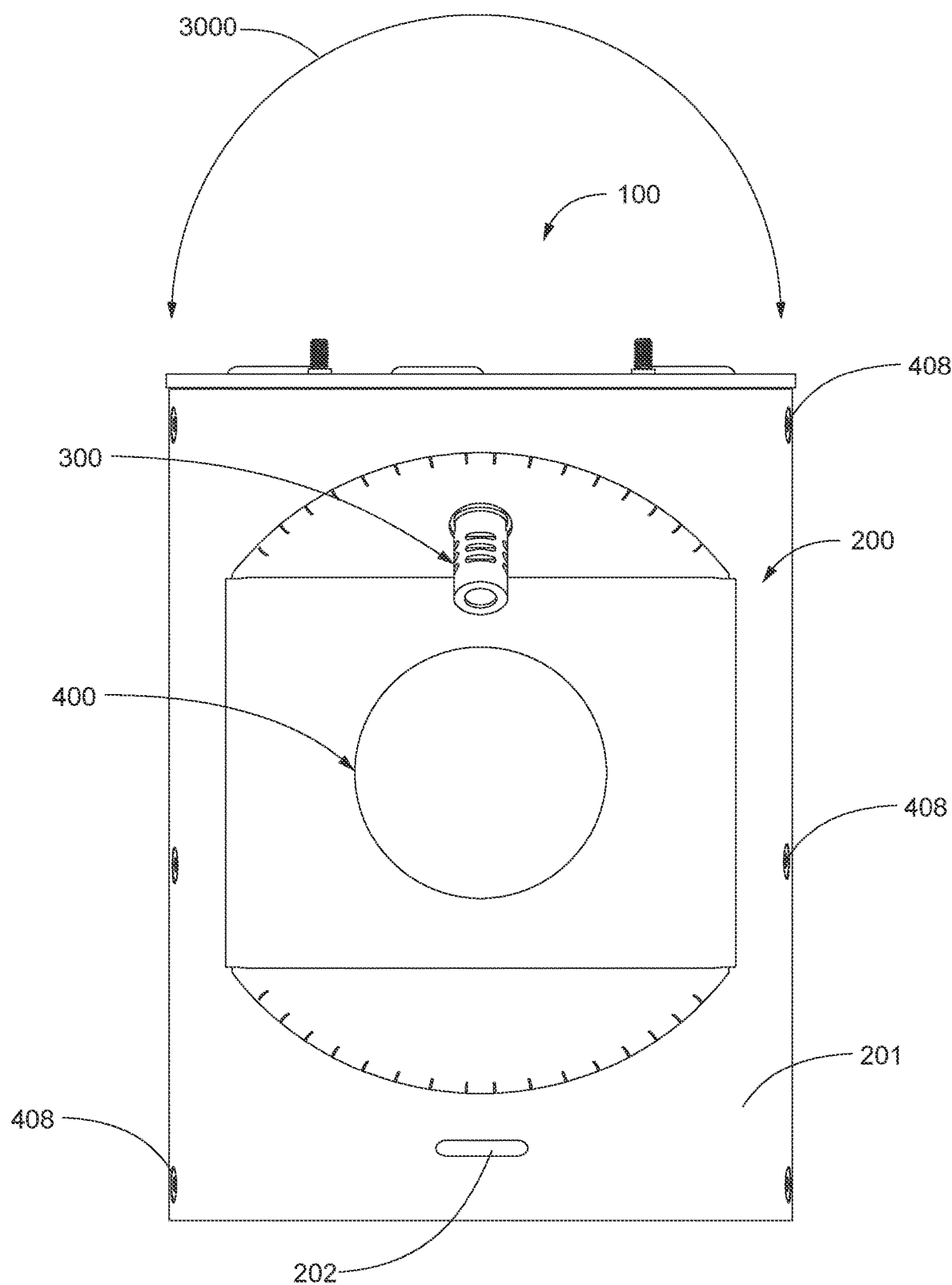
Figure 3:
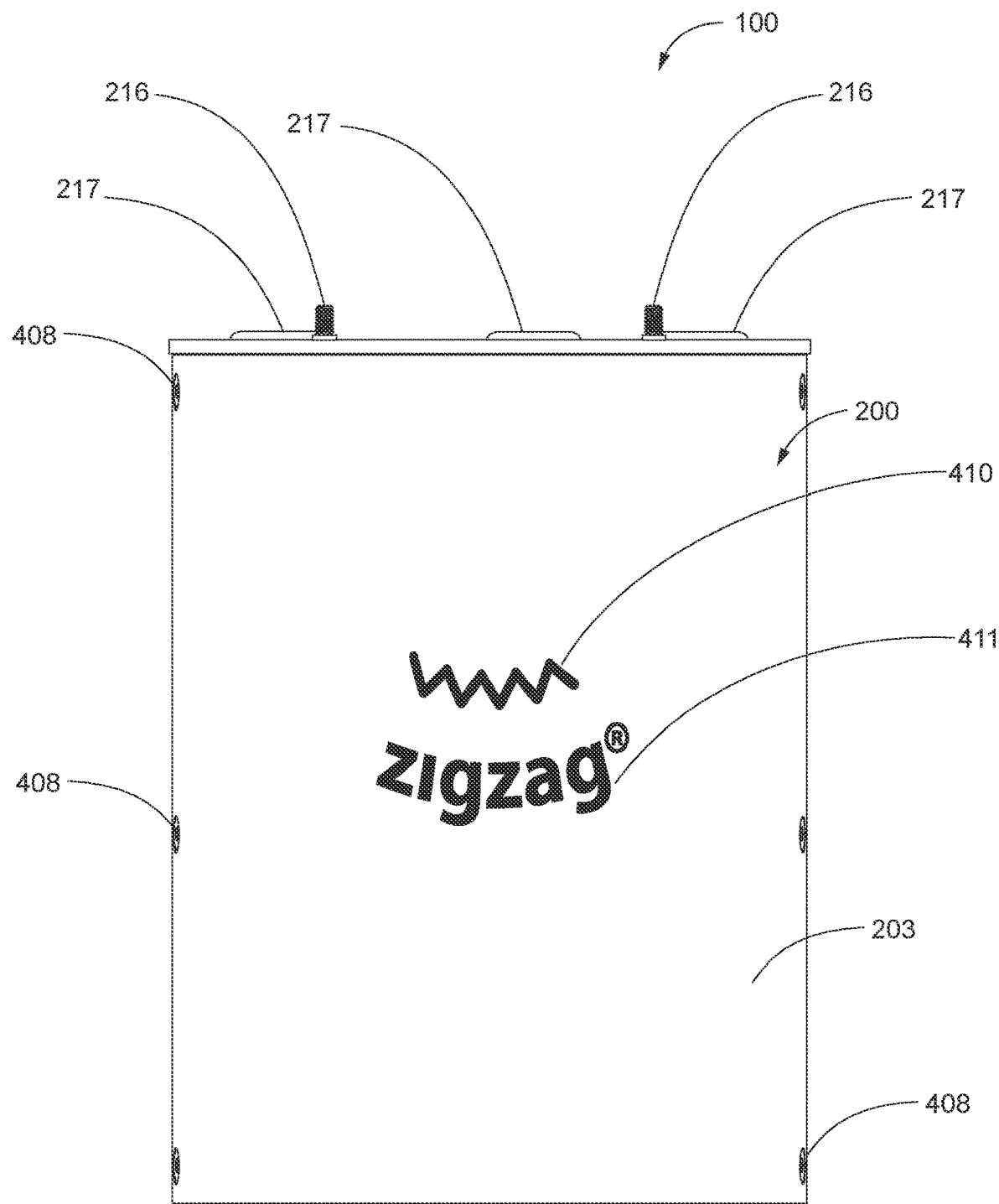
Figure 4:
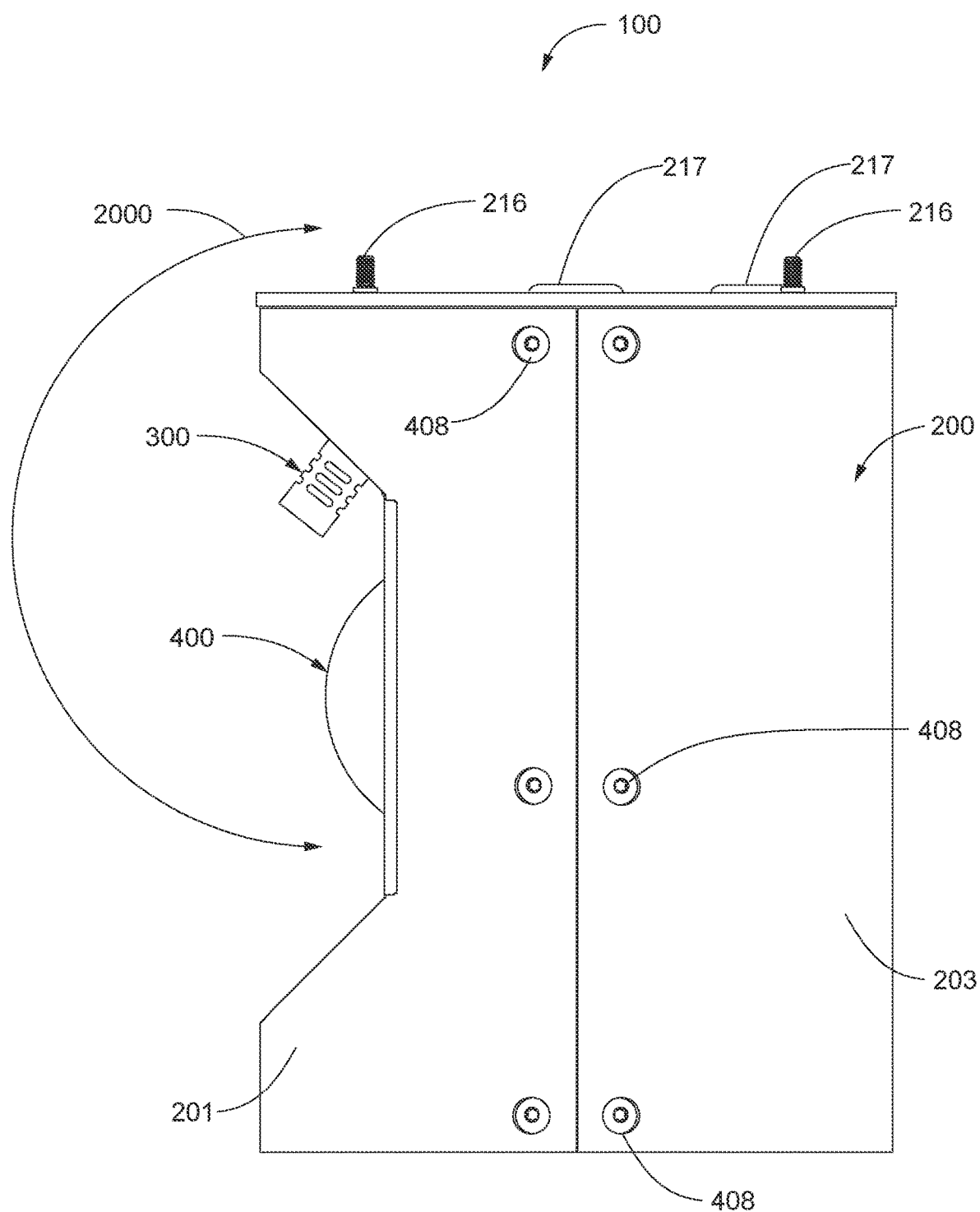
Figure 5:
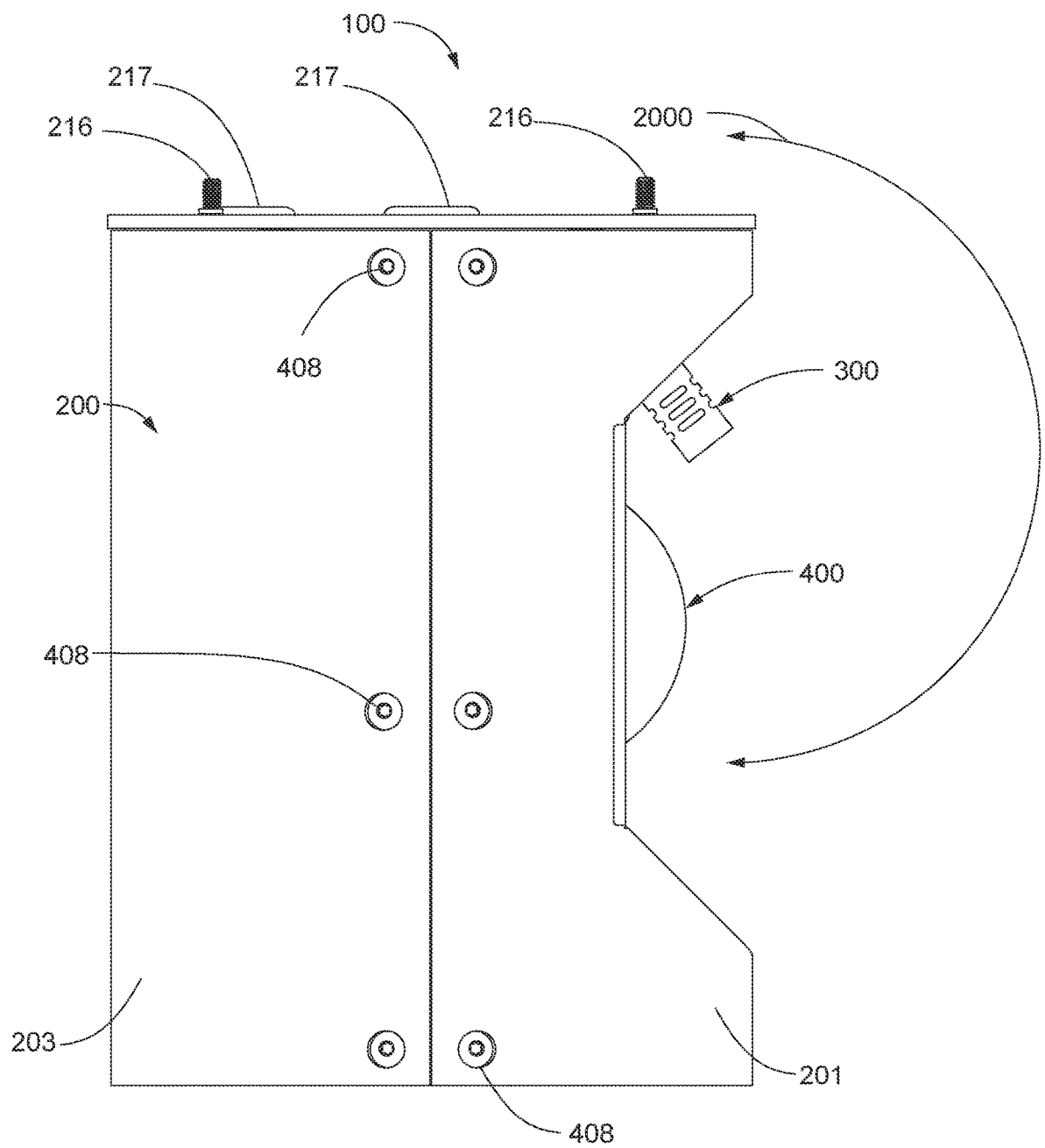
Figure 6:
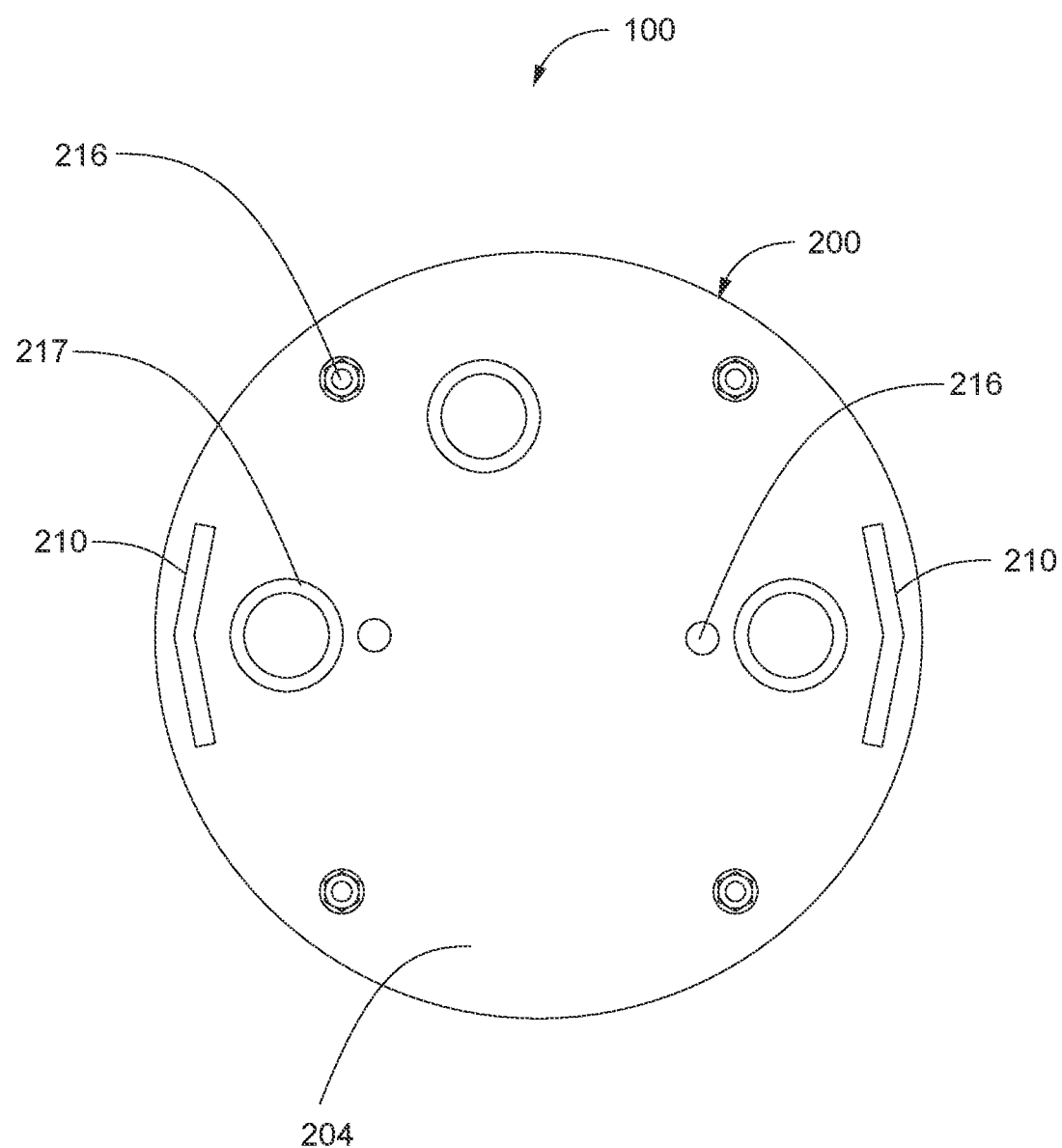
Figure 7:
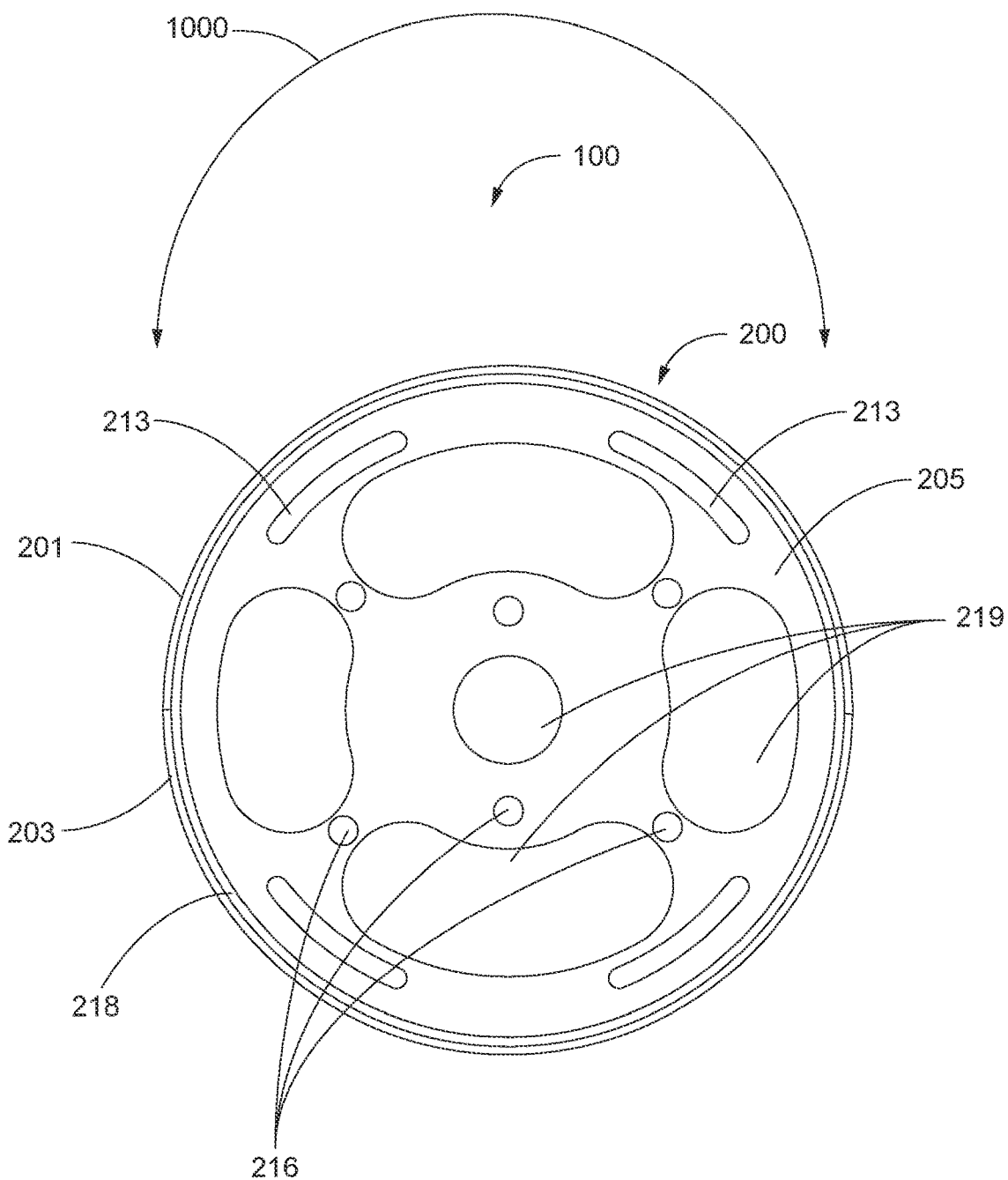
Figure 8:
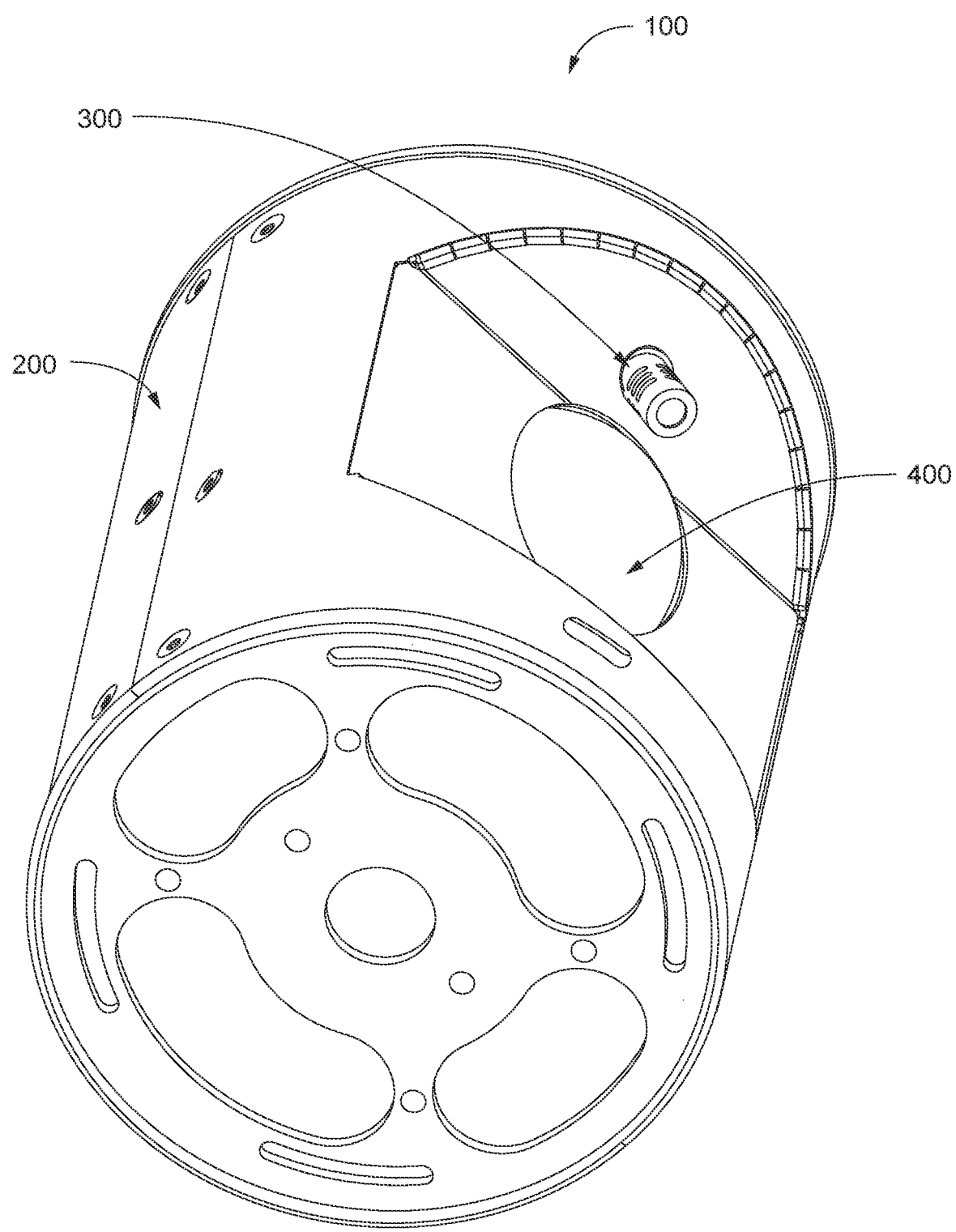
Figure 9:
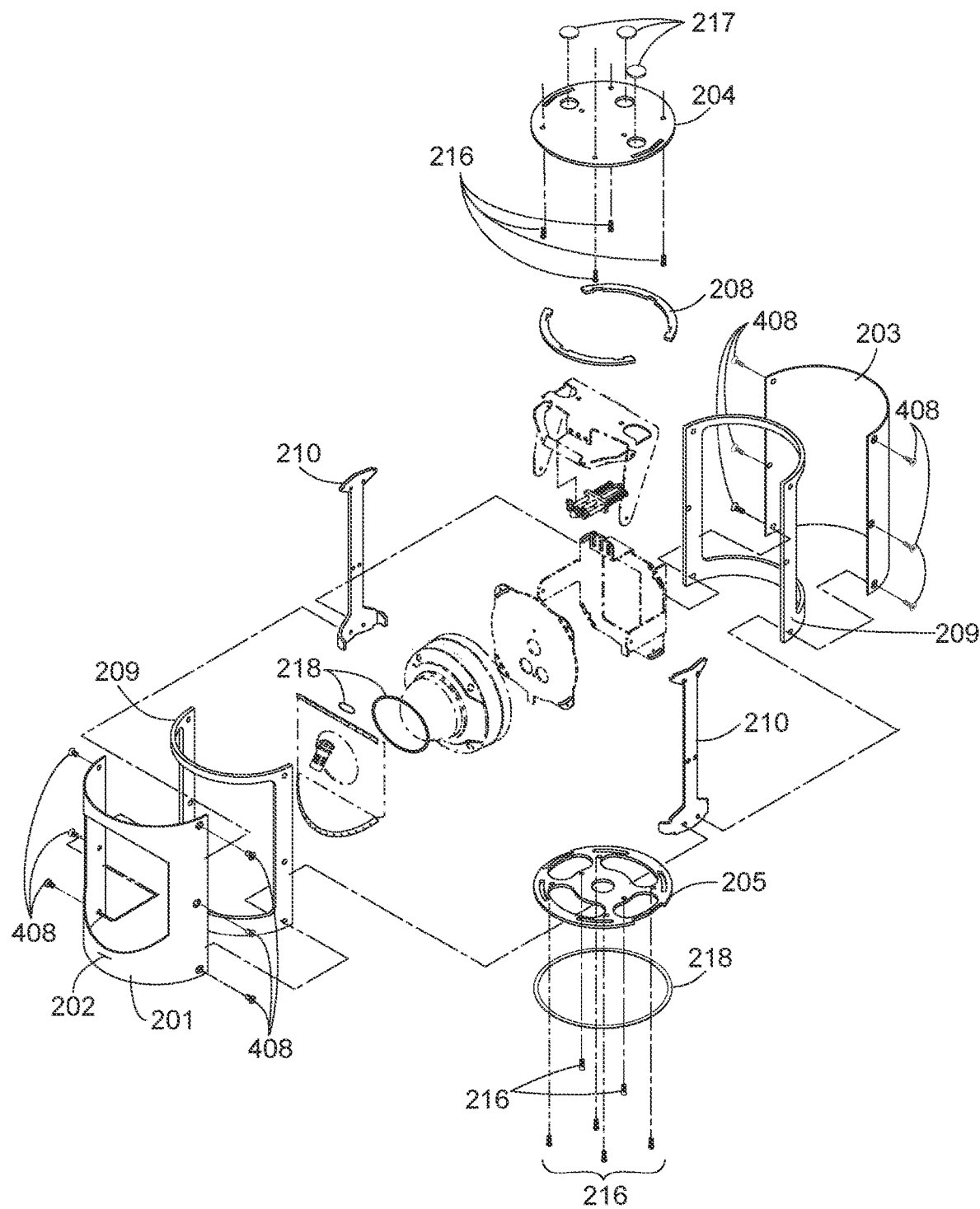
Figure 10A:
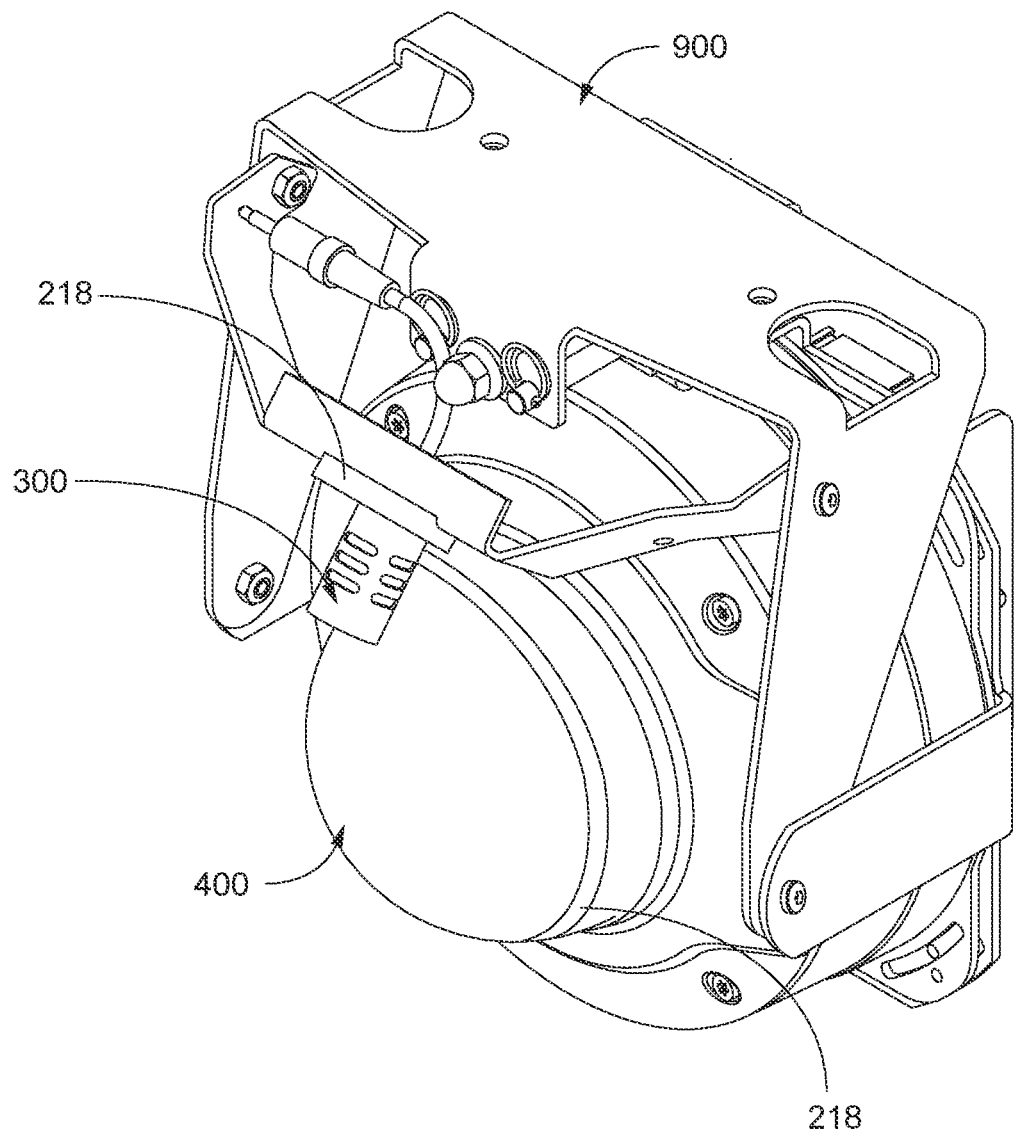
Figure 10B:
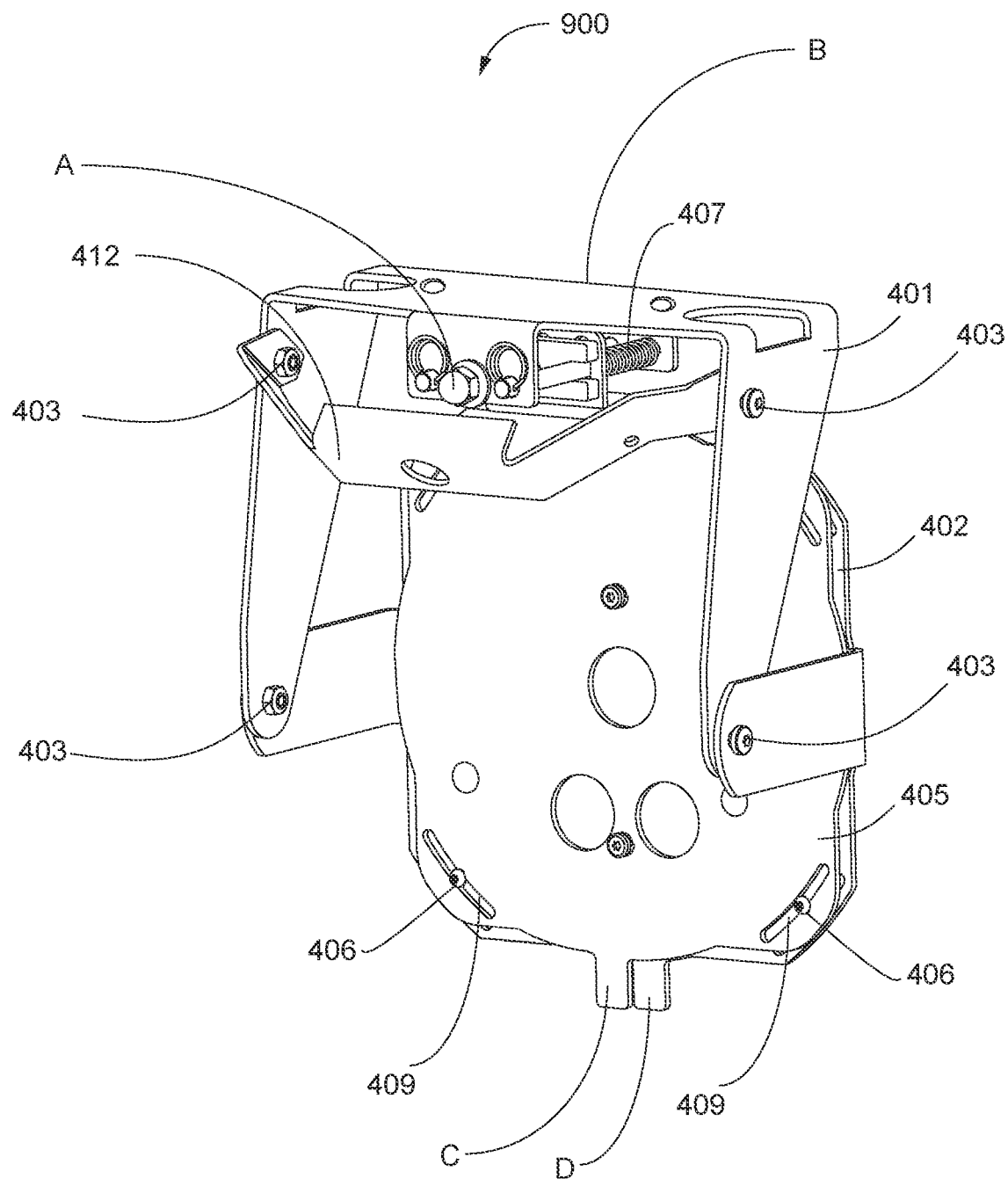
Figure 11:
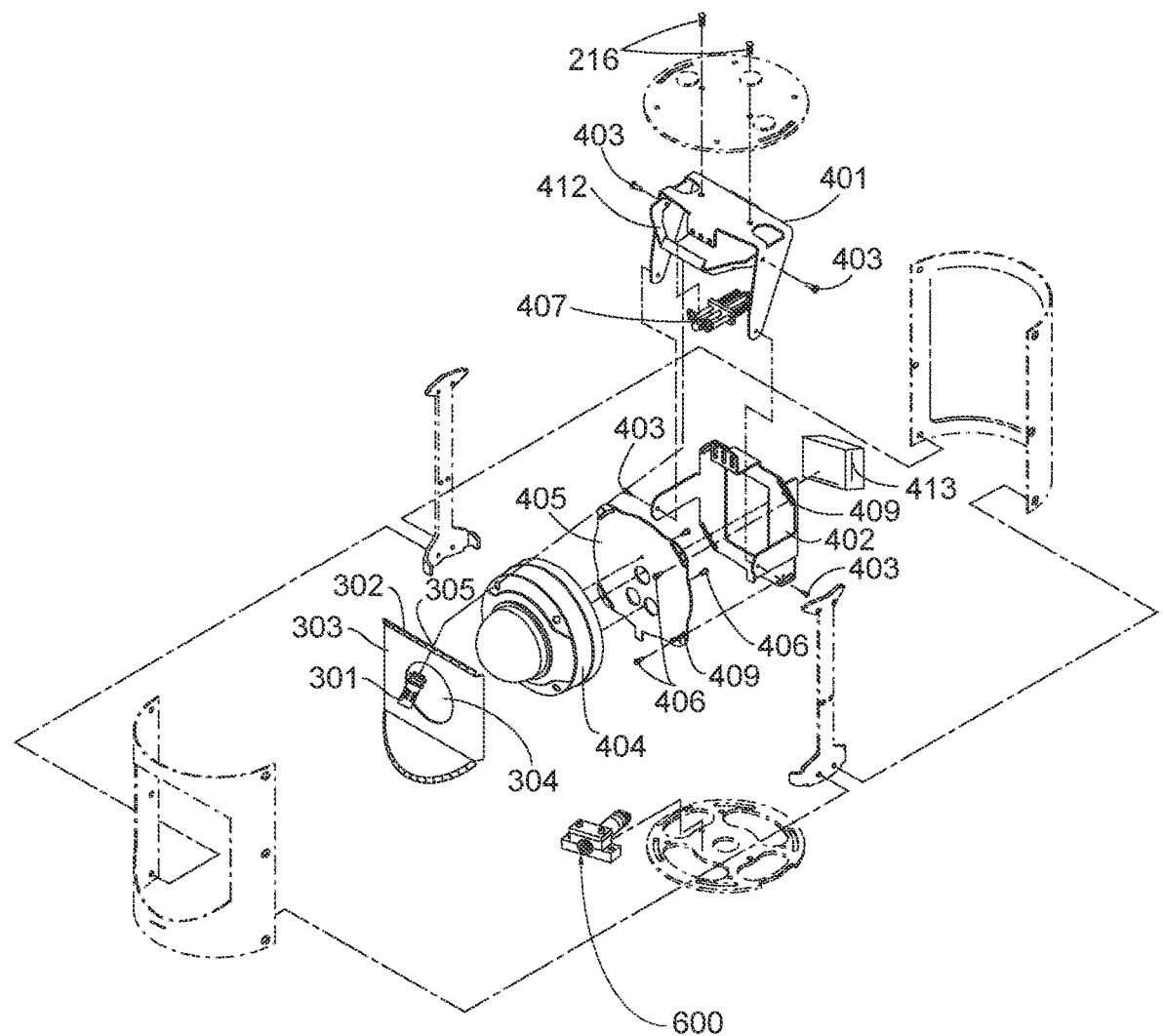
Figure 12A:
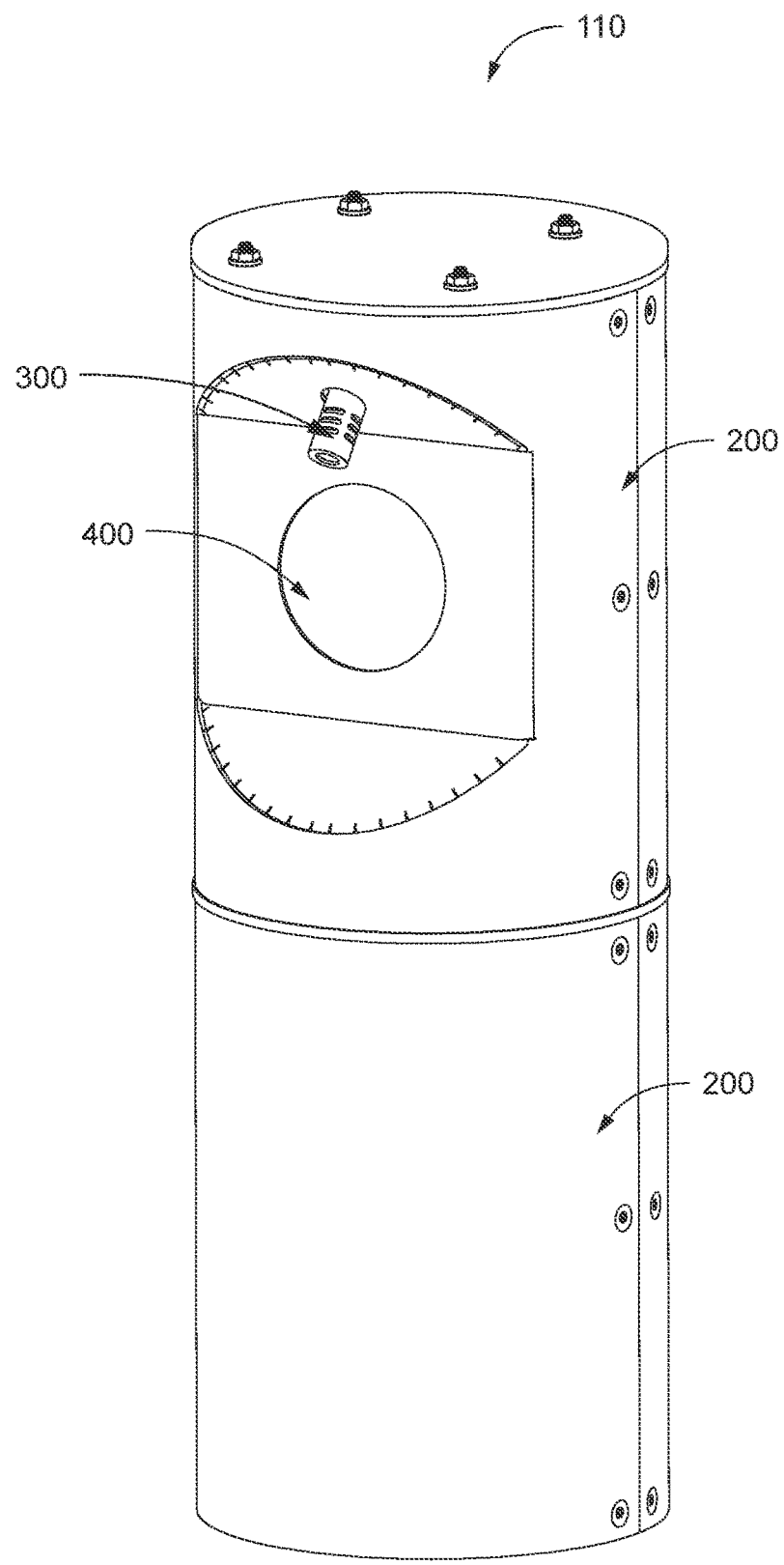

FIGS. 12A and B illustrate an alternative possible design of capture and distribution system according to aspects of the present invention; here, in a general wireless configuration—a more specific configuration for cellular is later discussed.

As envisioned, capture and distribution system 110 includes the same housing subassembly 200, microphone subassembly 300, camera subassembly 400, internal subassembly 900, and laser aiming assembly 600 as in Embodiment 1. Laser aiming assembly 600 generally includes a battery powered laser 601 having an emitting face 602 which projects a laser beam of sufficient power and dimensions (a line laser is later discussed, though this could differ) which is mounted in a jig 603 affixed to bottom plate 205 of the upper housing subassembly 200 at a predetermined angle (which is set at the factory); see again incorporated U.S. Publication No. 2013/0268246 for details. All of the aforementioned are stacked and affixed via fastening devices 216 (as previously discussed) to a lower housing subassembly 200 having two back clamshells 203 (instead of front and back clamshells 201, 203), and which includes a wireless subassembly 500 to facilitate wireless communication, power control, or the like. In this manner, a single capture and distribution system 110 includes two modular enclosures; though as will be discussed, not all components may be concealed or housed by said enclosures.

Figure 12B:
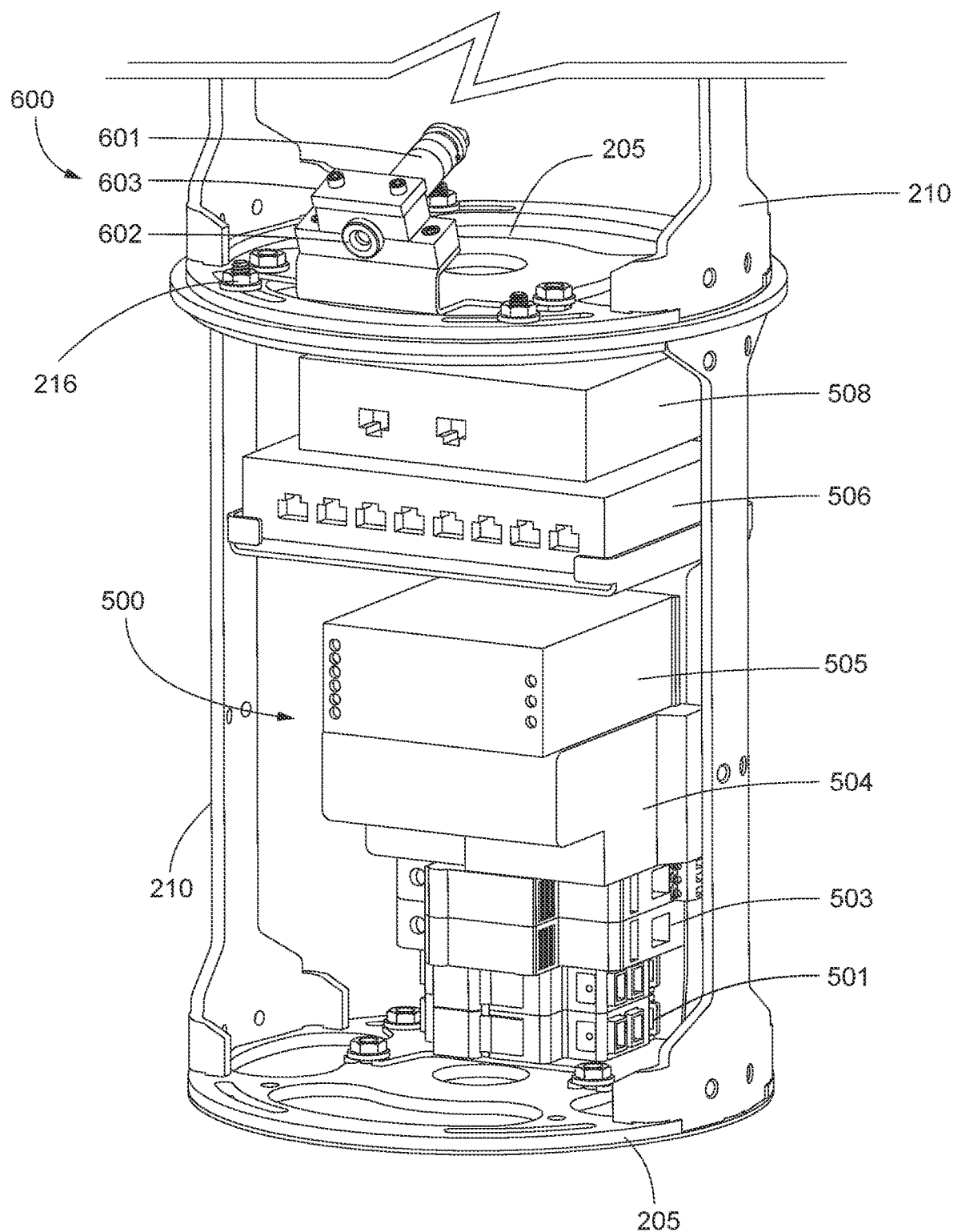
Figure 17A:
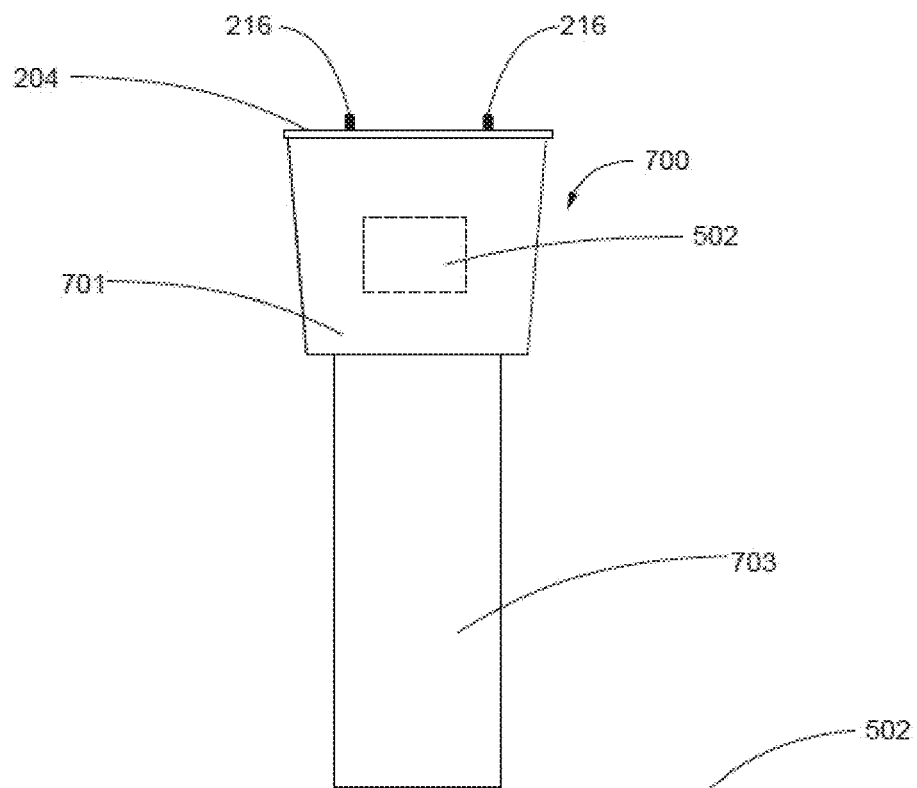
Figure 17B:
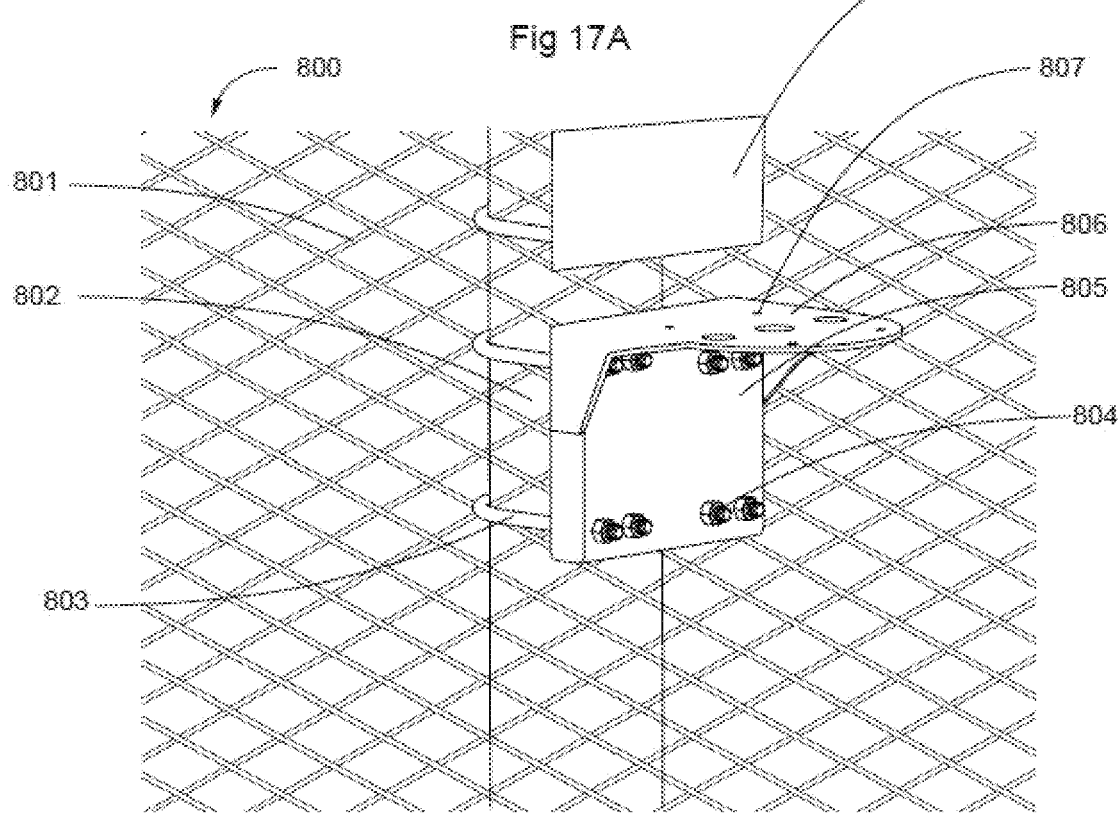

In practice, wireless subassembly 500 will differ in size and composition depending on the needs of the user and site characterization (later discussed), but generally comprises one or more fuse/fuse holders 501 (e.g., model Bussmann FNQ-15 available from Eaton Corporation, Cleveland, Ohio, USA and model LPSM001QCID available from Littelfuse, Inc., Chicago, Ill, USA, respectively), a PtP radio 502 (e.g., model NANOSTATION® Loco5AC available from Ubiquiti Networks, Inc., New York, N.Y., USA), one or more surge protection devices 503 (e.g., model ERICO TDS1502BR150 available from nVent Electric PLC, London, United Kingdom), a surge filter 504 (e.g., model ERICO TSF6A120V available from nVent Electric PLC, London, United Kingdom), a power supply 505 (e.g., model MDR-60-48 available from Mean Well USA, Inc., Fremont, Calif., USA), a PoE switch 506 (e.g., model US-8-60W available from Ubiquiti Networks, Inc., New York, N.Y., USA), and a PoE adapter 508 (e.g., any model of LigoPoE converter available from LigoWave Inc. Limited, Canton, Ga., USA). It can be seen that PtP radio 502 is missing from FIG. 12B; this is because, as envisioned, clamshell halves 201, 203 are formed from powder coated aluminum alloy—which is not conducive to radio transmission. As such, even though radio 502 forms a part of wireless subassembly 500, it is located outside of lower housing subassembly 200; FIGS. 17A, 17B, and 17D all diagrammatically illustrate possible placement of part 502, and are discussed in greater detail later.

D. Exemplary Apparatus Embodiment 3

Figure 13A:
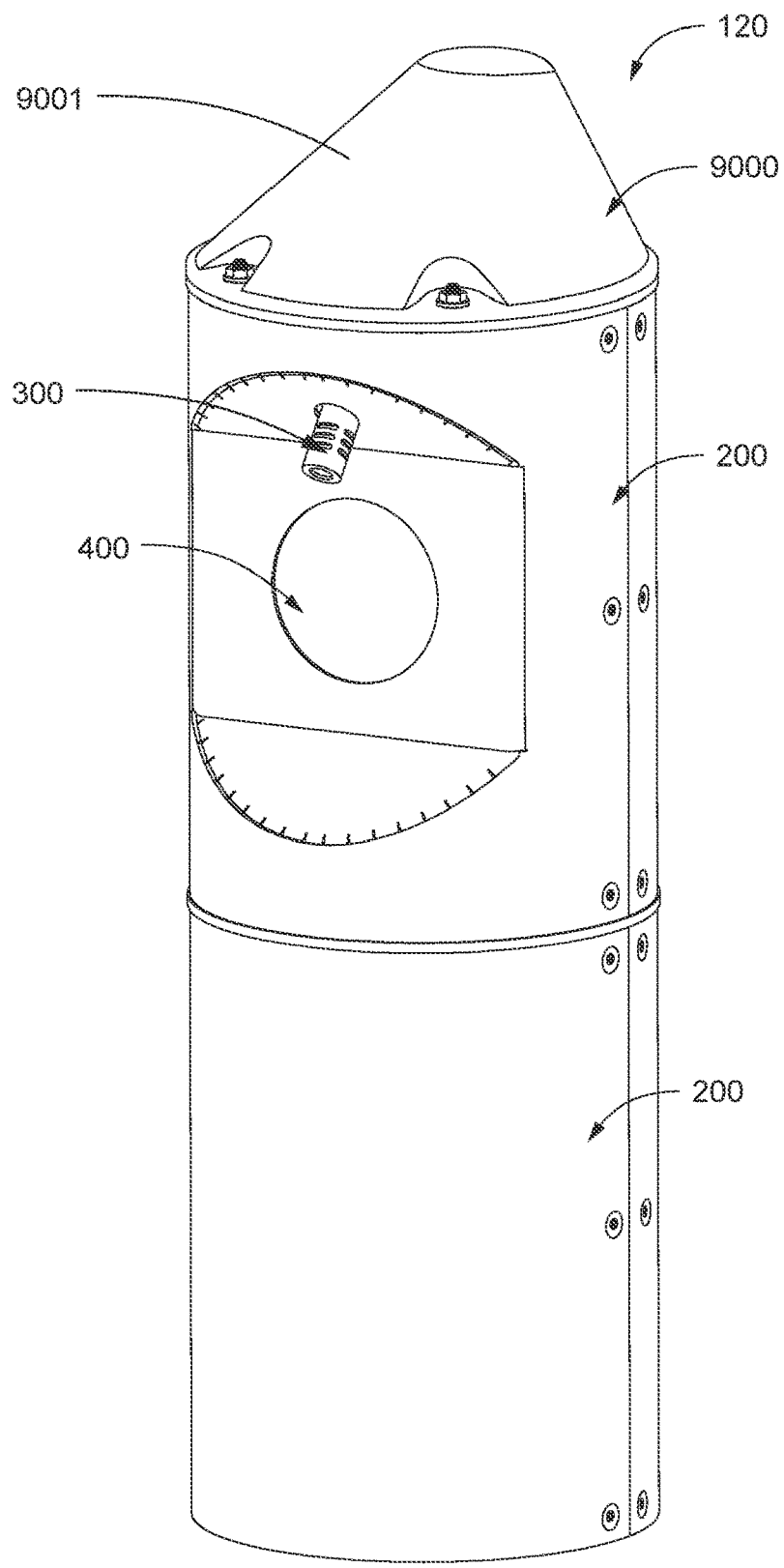

FIGS. 13A and B illustrate an alternative possible design of capture and distribution system according to aspects of the present invention; here, in a cellular configuration.

Figure 13B:
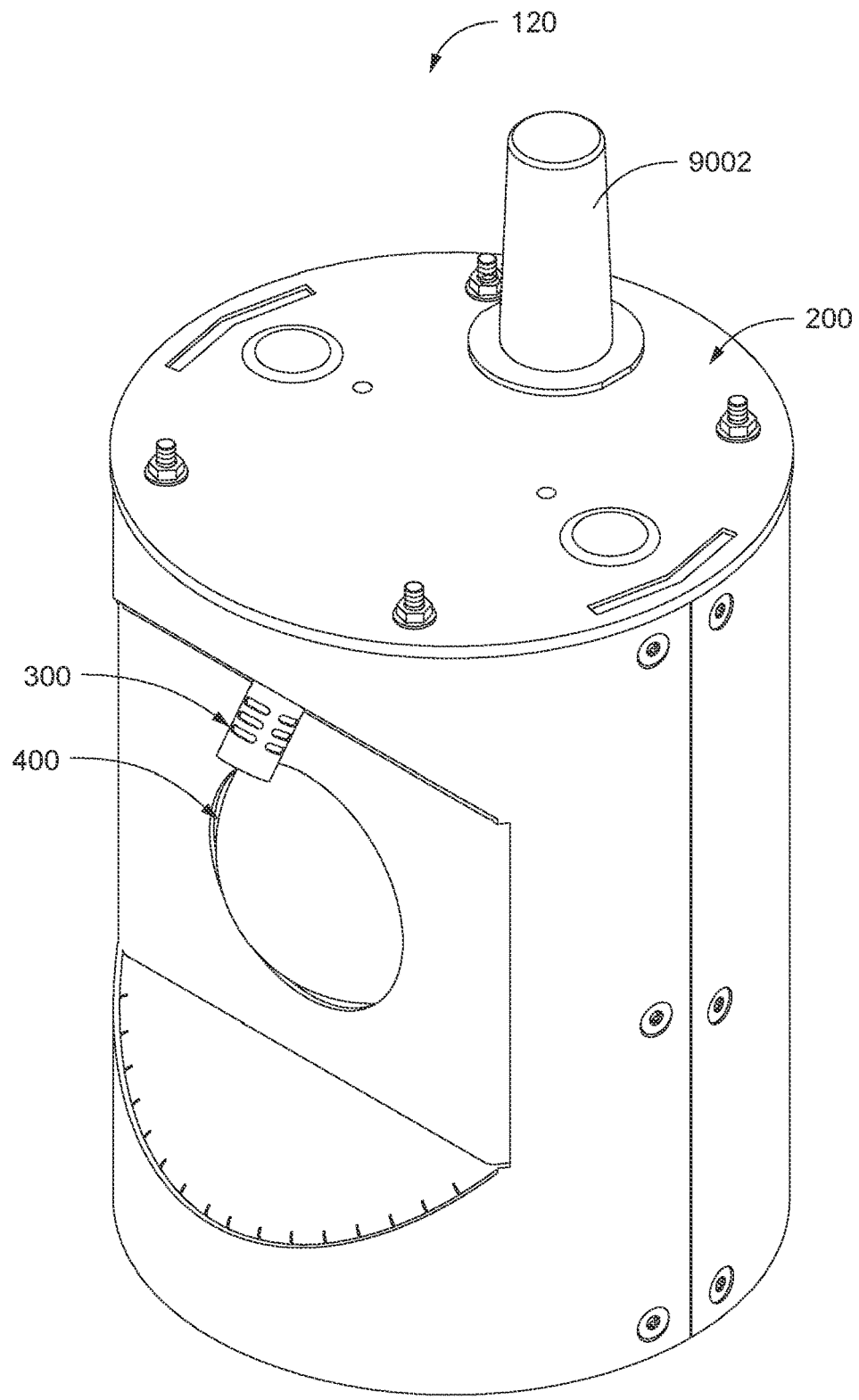

As envisioned, capture and distribution system 120 includes the same housing subassembly 200, microphone subassembly 300, camera subassembly 400, internal subassembly 900, and laser aiming assembly 600 in an upper modular enclosure as in Embodiment 2. A lower modular enclosure includes the same lower housing assembly 200 (i.e., having two back clamshells 203), but wireless subassembly 500 is modified for cellular communications; for example, the typical PtP radio and switch (see reference nos. 502 and 506, respectively) in a wireless configuration may be substituted with a cellular radio (e.g., model Skyrouter Z4550 available from Ctek, Inc., San Pedro, Calif., USA) and cellular antenna 9002 (e.g., any of the PHANTOM™ radio antennas available from Laird PLC, London, United Kingdom). Cellular antenna 9002 fits into an aperture of top plate 204 (i.e., by removing plug 217—see FIG. 13B), and forms part of a cellular subassembly 9000 which also includes a top cover 9001 to conceal and protect cellular antenna 9002 from damage. As envisioned, top cover 9001 is formed from KYDEX® 100 (available from SEKISUI SPI, Holland, Mich., USA) so not to impact performance of antenna 9002 (as opposed to, for example, the aforementioned powder coated aluminum alloy).

E. Exemplary Method

Figure 14:
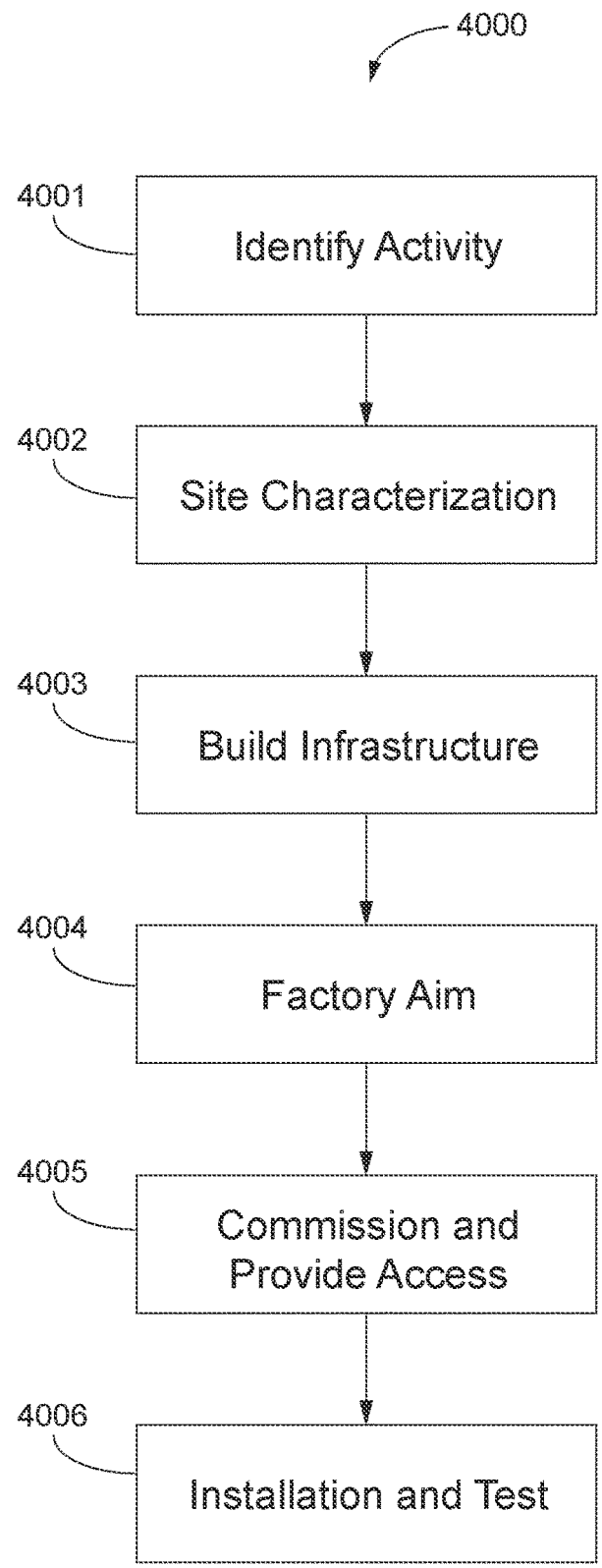
FIG. 14 illustrates one possible method of producing a capture and distribution system according to aspects of the present invention.

In practice, a capture and distribution system developed in accordance with the present invention could take on a variety of shapes, sizes, functionalities, and the like; systems 100, 110, and 120 are three possible examples. Regardless, the approach to designing said capture and distribution based on both the needs of a user and the characteristics of site may be the same. One such method 4000 is illustrated in FIG. 14, and is presently discussed.

Figure 16:
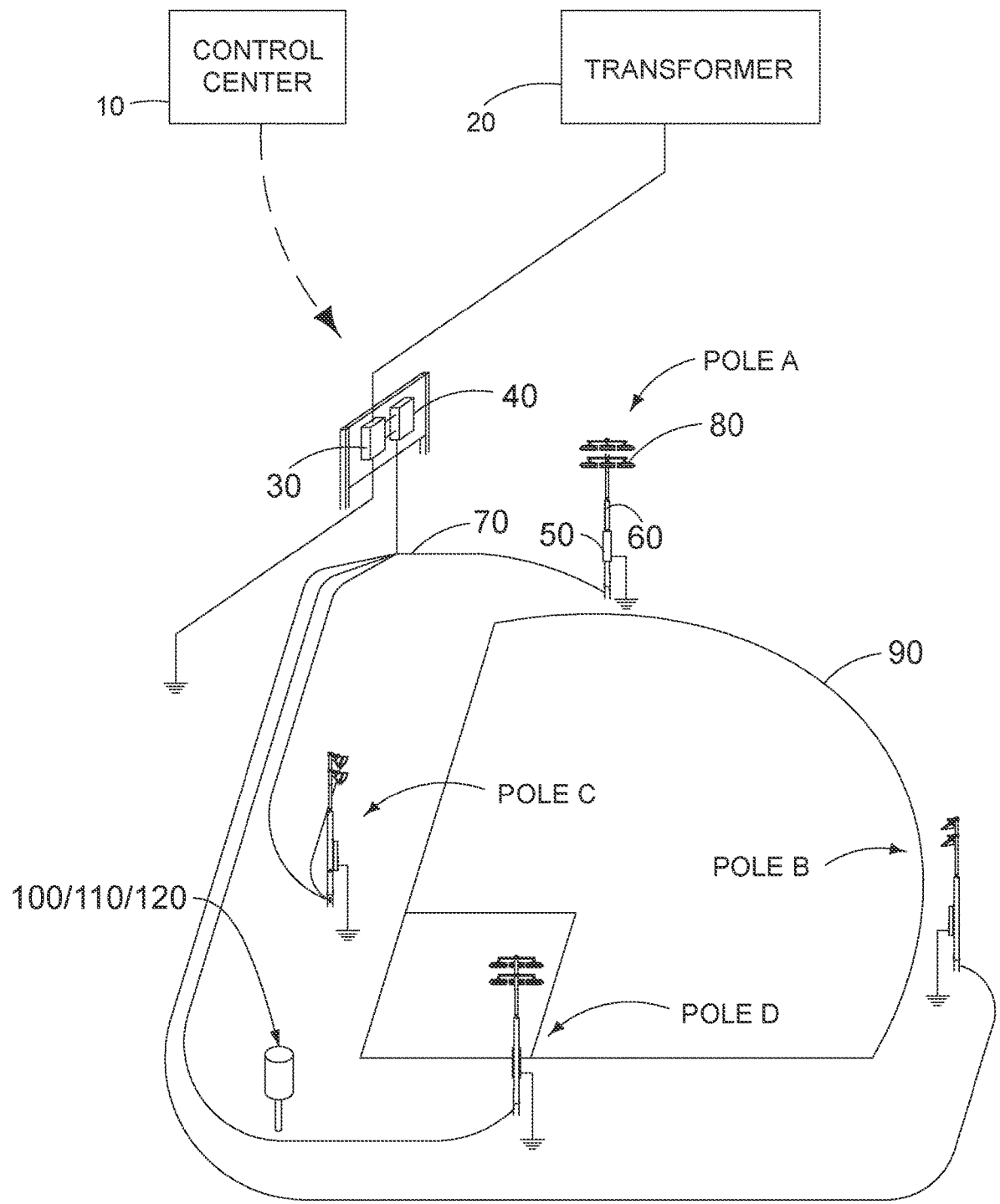
FIG. 16 illustrates one possible site and one possible installation location for one or more capture devices at said site according to aspects of the present invention.

A first step 4001 comprises identifying the activity or venue or event or feature of interest at a site as this will most likely dictate not only the number and type of capture devices, but also mounting locations and aiming angles. Take, for example, a typical four-pole softball field as is illustrated in FIG. 16. Here a transformer 20 delivers power to a distribution cabinet 30 which is distributed to each lighting fixture 80 at each pole 60 via power lines 70 which are conditioned for the specific lighting load at pole cabinets 50; this is well known in the art of sports lighting. Oftentimes some kind of facility management system 10 controls the array of lights via remote operation of contactors or other power means in a control cabinet 40 such that they illuminate a target area 90 at desired times; note target area 90 oftentimes not only includes a field of play, but a three dimensional space proximate the field of play (e.g., to illuminate balls in flight). So using the venue of FIG. 16 as an example case, a first step 4001 may comprise determining the location of the most interesting aspect of play and what sort of capture device may be most appropriate for capturing said aspect of play; here, a capture and distribution system of any of the designs of Embodiments 1-3 is mounted behind home plate and oriented so to capture the perspective of the pitcher throwing a ball generally towards a batter (and towards microphone/camera subassemblies 300/400). The precise mounting height and orientation of capture and distribution system 100/110/120 in FIG. 16 is dependent upon measurements from a site characterization, step 4002. A wealth of information about a site can be found from commercially available geobrowsers (e.g., Google Earth available from Google LLC, Mountain View, Calif., USA) including but not limited to, site dimensions, site topography, and site infrastructure, but it is unlikely that use of geobrowsers will address all considerations according to step 4002. In addition, it is likely an interview with the user and/or a site visit will be conducted so to ascertain internet presence, ISP information, available bandwidth, staffing capabilities, available power, limitations for conduit or wireless line-of-sight, and desired onsite user interfaces (e.g., dedicated touchscreen versus phone app), for example.

In practice, most softball fields such as that illustrated in FIG. 16 will include only one modular enclosure (e.g., because there is not available bandwidth for additional capture devices) with a camera having an impact resistant lens cover. Said modular enclosure will likely be mounted behind home plate at a mounting height of approximately 12 feet and aimed approximately 10 degrees down from horizontal (e.g., from the centerpoint of the camera); again, mounting height and aiming will vary for different sports, different mounting locations, etc. For this specific example, the goal is to capture a still image or video of the entire field of play, centered on the pitcher, with the horizon more or less horizontal across the image, without direct view of the outfield lights (e.g., to avoid glare), while adequately capturing the relationship between the pitcher and the batter.

According to step 4003, site-specific infrastructure is built for mounting capture and distribution systems 100/110/120. This step includes not only consideration of the design, thickness, and material selection of housing subassembly 200, but consideration of how to interface with existing site features, and how to include aforementioned PtP radio 502. For example, in FIG. 16 there is no backstop available for mounting so capture and distribution system 100/110/120 is mounted on a freestanding structure; this is illustrated in detail FIG. 17A. As can be seen, freestanding structure assembly 700 includes a pole section 703, shell 701, and top plate 204. As envisioned, shell 701 is formed from the aforementioned KYDEX® material, is seated on or otherwise mated to pole section 703, and houses PtP radio 502. Pole section 703 could be electrically insulative or nonconductive (e.g., inexpensive fiberglass), or if not, surge protection could be contained in shell 701.

In the event a chain link backstop is available, a suitable bracketing system 800 may instead be constructed; this is illustrated in greater detail in FIG. 17B. Here, u-shaped bars 803 are run around a pole section 802, through openings in backstop fence 801, and positionally affixed to a bracket plate 805 via fastening devices 804. A mating portion 806 having apertures 807 similar to top plate 204 can be slip-fit, affixed, clamped, welded, or otherwise mated to bracket plate 805; this again ensures universal top and bottom plate functionality for stacking modular enclosures, and more generally, provides infrastructure for PtP radio 502.

However, if the backstop is mesh, a mesh bracket system 7000 may instead be used; this is illustrated in FIG. 17C. Here, a modular enclosure may be seated between and affixed to a pair of mounting plates 7001 such that the field of view of capture devices contained therein is generally through window 7003 (which generally aligns with a hole cut in said mesh backstop). Window 7003 and mounting plates 7001 are colocated and rigidity added with strengthening arms 7006, and the remaining mesh backstop (i.e., the portion not cut out and proximate window 7003) is clamped between frame portions 7002 and 7004 (which are positionally affixed with fastening devices 7005). Support (e.g., to prevent sagging and tearing of mesh) for the aforementioned is provided via a pole section 7007; if formed from an RF-transmissive material, PtP radio 502 may be contained therein.

Lastly, if a metal pole is available for mounting, it may be desirable to weld a bracketing system directly to said pole, yet adapt said bracket to be removable (e.g., to switch in and out capture and distribution systems as needs change); such a design 8000 is illustrated in FIG. 17D. Here, a first bracket portion 8001 is welded to a pole 8002, and a second bracket portion 8003 with mating portion 8004 (which could be of a similar design to portion 806 of FIG. 17B) is removably connected to first bracket portion 8001. Such two-part bracketing systems are well known in the art, and may be similar to those described in U.S. Pat. No. 6,988,697; said bracketing systems may also be used to support PtP radio 502.

Figure 15:
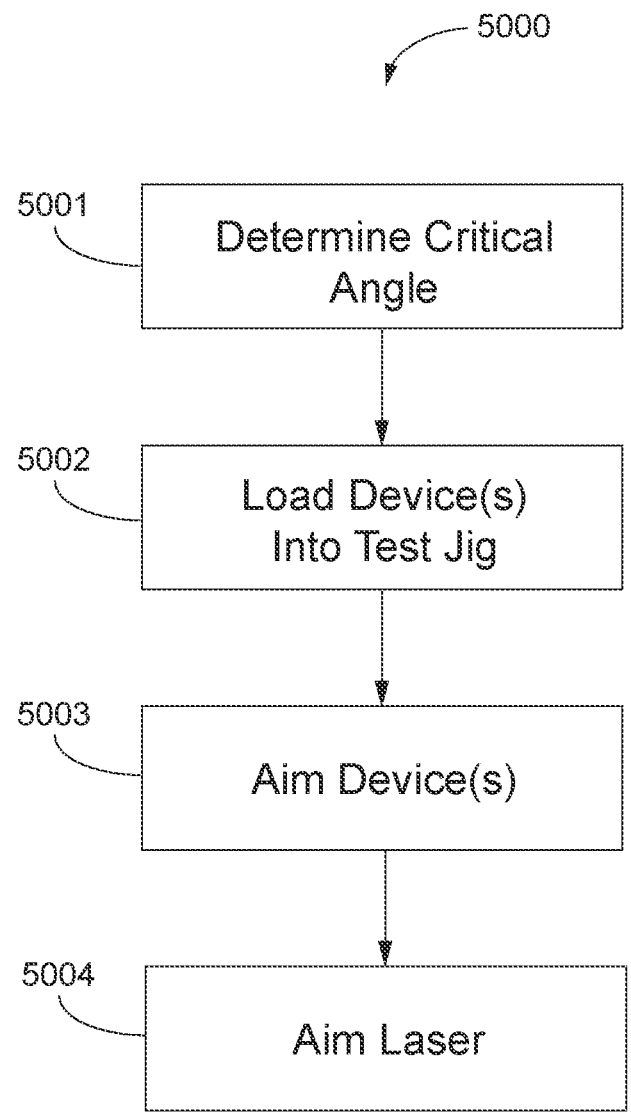
FIG. 15 illustrates one possible sub-method of factory aiming capture devices according to the method of FIG. 14.

According to step 4004 the capture devices selected according to step 4001 are factory aimed to the correct aiming angles determined according to step 4002 using a test jig for the site-specific infrastructure developed in step 4003; this is illustrated in greater detail in FIG. 15. According to a first step 5001 of sub-method 5000 a critical angle is determined; this angle can differ from site to site depending on the event or feature or time of interest, mounting height (which may need to take into account blocking the view of spectators or limitations to line-of-sight for wireless devices), number of capture devices, and the like. As previously stated, for a softball field such as that illustrated in FIG. 16 the critical angle is 10 degrees down from horizontal when the centerpoint of a camera is mounted behind and 12 feet above home plate. The critical angle is likely already known in accordance with step 4002 of method 4000, but it is possible that different capture devices may physically interfere with one another if set at desired angles according to step 4002, and so it is beneficial to at least verify feasibility of the critical angle according to step 5001.

According to step 5002 of sub-method 5000, at least some portion of capture and distribution system 100/110/120 is loaded into a test jig. With respect to the exemplary embodiments, since microphone subassembly 300 and camera subassembly 400 are both affixed to yoke 401, which is further affixed to top plate 204, a test jig designed to hold top plate 204 would be all that is required to factory aim the microphone and camera subassemblies irrespective of the design of any housing subassemblies or site-specific infrastructure; in practice, the test jig could be a simple infrastructure that keeps a part level and in a known relationship with a grid. Then according to step 5003 any camera capture devices in the test jig are aimed in axes 1000, 2000, and/or 3000. Camera 404 (and any other capture devices being aimed in accordance with step 5003) are then aimed to a point on a grid or wall which is site specific (again, taking into account mounting height, venue, sport, etc.), within a reasonable degree of accuracy (e.g., off from aiming no more than ½ degree). Principles of using a jig to repeatedly and reliably aim assemblies to a site-specific aiming angle within a reasonable degree of accuracy are well known in the art—and are further discussed in aforementioned incorporated U.S. Pat. No. 8,717,552.

Figure 18B:
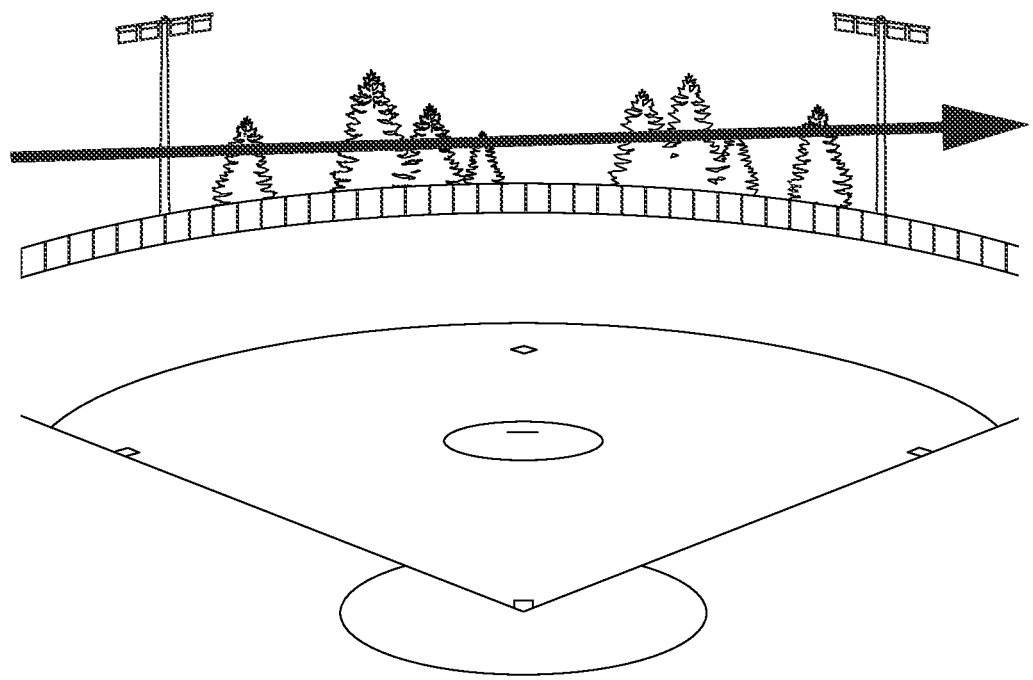

It is important to note that camera 404—and any capture device—is only aimed according to sub-method 5000 after being assembled. This is important because oftentimes extra components—such as impact resistant lenses which are not a part of the base product—throw off aiming or alignment of devices if installed in situ; this is generally illustrated in FIGS. 18A and B. FIGS. 18A and B represent live images taken from cameras; note that the live image from the camera in FIG. 18A appears off-axis (as evidenced by the arrow tracking along the horizon). FIG. 18B shows the same site from the same capture device, but after re-aiming the capture device; note that the horizon appears horizontal and produces a more pleasing aesthetic than that of FIG. 18A. This is one of the many benefits of pre-aiming, pre-wiring, and pre-commissioning capture and distribution systems in a factory setting; namely, recognizing and compensating for variability in capture devices before installation (which can lead to reduced onsite labor for final adjustments, and reduced potential for installation errors). Further, as previously stated aiming of camera 404 automatically correctly orients microphone 301 due to construction of parts 302-305; not only does this aid in rapid factory aiming, but it ensures that a system, rather than individual parts, is delivered to a user—and in a manner customized for their needs and their site.

A final step 5004 of sub-method 5000 comprises aiming a line laser 601 of laser assembly 600 in a known relationship to the capture devices, and which can be correlated to a known onsite feature of the actual site, such that alignment of the laser to said feature on site automatically aims all capture devices. For the example of FIG. 16, leveling laser assembly 600 and orienting the laser line vertically in a factory setting permits an installer to later transport pre-aimed capture and distribution system 100/110/120 to the site, install it on site-specific infrastructure (see previous discussion of fastening devices 216), energize laser 601, and perform fine tuning in one, two, or three axes (see previous discussion of pivot axes 1000, 2000, and 3000) until the laser line bisects the pitcher's mound (as an example)—and in doing so ensure all other capture devices are aimed without having to actually aim them on site.

Turning back to method 4000, step 4005 comprises providing at least a first level of wiring (if not already completed pursuant to factory aiming) and commissioning of devices, and providing access in a factory setting. As envisioned, all capture devices according to the present embodiment are ISP based, and so all devices are configured in a factory setting to talk to a single access point regardless of communication protocol; this removes the concern of capture devices from different manufacturers only being compatible with certain software. In practice, this single access point is likely a website associated with a cloud network to which any existing facility management system (if any) also has access, though this could differ and not depart from aspects according to the present invention. For example, capture devices could be configured to talk to multiple access points (e.g., a user's own website and a portal provided by the aforementioned CONTROL-LINK® control system and scheduling service); this removes the concern of device software which may not be compatible with existing facility management systems.

Said access point (e.g., website) could be adapted to a variety of technology platforms using apparatus and methods well known in the art; for example, a widget could be embedded in an owner's existing website which is enabled with a video player so to play on demand content from a video camera installed at a venue according to aspects of the present invention. Alternatively, if an owner has no website a dedicated and hosted website could be provided and the owner of the venue provided access credentials pursuant to step 4006 (later discussed). Further still, if the site characterization of step 4002 shows there is no internet presence at the site, aspects of the present invention could still apply and add value for a user; for example, capture devices which operate on a cellular platform could be used (see Embodiment 3), or capture devices could be commissioned according to step 4005 to operate solely on a local network. All of the aforementioned are possible, and envisioned, to provide onsite and/or offsite access to content, and in some cases distribution of content, of capture devices according to aspects of the present invention.

As a final step 4006 the customized capture and distribution system is shipped to the site, finally wired (e.g., running wiring from capture and distribution system 100/110/120 to cabinets 30, 40, or 50, FIG. 16), finally aimed (e.g., orienting the laser line to a known onsite feature as previously discussed), and finally commissioned (e.g., teaching the owner how to access the aforementioned website associated with the capture and distribution system).

One possible single access point user interface 6000 which could be provided to a user in accordance with step 4006 is illustrated in FIG. 19. Here, after providing credentials a user can navigate a webpage 6001 including a viewing window 6002 which displays a live event, recorded event, or the like—depending on the site, user's needs, installed capture devices, and available content, for example. Each credential will correlate to a user- or site-specific option bar 6003; here, a user can select live events or past events associated with one or more sites 6005 by scrolling 6004 through a list of options, or a user can scroll through a list organized by site. Options 6006 available to the user will likely differ depending on the site, nature of content, and skill of the user, as an example. Some possible options available to a user for the selected site and event are shown in field 6008 (each of which may be scrolled through 6007 and selected via e.g., mouse click). In practice, user interfaces can vary greatly in terms of content options, display, layout, technology platform, and the like. It is important to note that each site may have multiple users—and so different credentials may be needed for varying degrees of access. It is also important to note that a single user may have multiple sites—and so the ability to access all devices at all sites from a single access point may need to be considered. All of the aforementioned are possible, and envisioned according to step 4006.

F. Options and Alternatives

The invention may take many forms and embodiments. The foregoing examples are but a few of those. To give some sense of some options and alternatives, a few examples are given below.

Several different embodiments have been discussed herein; these are by way of example and not by way of limitation. Because each owner has particular needs and each site has particular characteristics, a number of different materials, power means, communication means, capture devices, fastening devices, and the like may vary—and not depart from aspects of the present invention. For example, FIG. 1 (Embodiment 1) illustrates fastening devices 216 as much longer than those in FIGS. 12A and 13A (Embodiments 2 and 3, respectively); aspects of the invention are not limited to a particular size or shape or even type of fastening device (e.g., clamps or welds or grommets could instead be used). As another example, FIG. 1 (Embodiment 1) illustrates an aperture for water shedding whereas FIGS. 12A and 13A (Embodiments 2 and 3, respectively) do not; a number of parts and features could be omitted (e.g., for an indoor application where moisture is not a concern) or modified (e.g., using non-watertight fastening devices) and not depart from aspects according to the present invention. As yet another example, certain parts (e.g., 413, 502) are only generically illustrated in the figures; these devices could take on a number of forms or shapes depending on the makes and models chosen (which could differ from those described herein).

Still further, capture devices may be different than those described herein (e.g., include motion sensors or heat sensors in lieu of cameras 404 and microphones 301), or modified from those described herein (e.g., a combination of wireless and wired configurations that relies on batteries or solar panels for power means, but traditional wiring for communication means). As another example, even where not generically rendered parts may appear different than those illustrated herein (e.g., top plate 204 may be spiked to deter birds from nesting). As another example, housing subassembly 200 could include indicia 410 and advertisements 411 (FIG. 3) to add flair, generate revenue, or, alternatively, simply colored to make the capture and distribution system blend into the surrounding environment.

Still further, parts described as modular may not be in practice—again, depending on a user's particular needs and a site's particular 30 characteristics. For example, part 302/303 might be welded to front clamshell 201 (e.g., if it is found microphones are always mounted at the same angle). Finally, materials, processing, and finishing could differ; for example, parts 209 and 218 may be formed from the same material (e.g., rather than foam tape and rubber-type material, respectively). All of the aforementioned are possible, and envisioned.

With respect to methods 4000 and 5000, it is important to note that there could be more, fewer, or different steps and not depart from aspects according to the present invention. For example, step 5004 of sub-method 5000 might be omitted if using capture devices that do not require precise aiming or have such a large field of view that eyeballing would suffice (e.g., sound sensors, motion sensors, cameras with a field of view over 100 degrees). As another example, step 4003 of method 4000 might occur after factory aiming (e.g., depending on lead times for parts). As another example, the site may not be a sports venue such as described herein; it may be a parking lot and so step 4001 may be modified not to identify an activity of interest, but rather a vantage point that would provide the most value to a user (e.g., for surveillance). Methods 4000 and 5000 could be expanded to provide added value for a user. For example, step 4001 may be expanded to include determining a "normal" set of operating hours for the site, step 4005 could be expanded to include loading those operating hours into each capture device (assuming they have such capability) such that capture devices are only consuming power and/or recording or transmitting content during said operating hours, and step 4006 could be expanded to train a user on how to modify those "normal" operating hour settings in the capture devices.

Lastly, while a particular user interface 6000 has been described to act as a single access point for one or more users, aspects of the present invention are not limited to such. For example, there could be two access points: one for modifying/monitoring operation of capture devices, and one for viewing content. Many capture devices (including at least some of those described herein) can be modified from offsite once commissioned and installed. For the example of off-axis aiming of camera 404 (see discussion regarding FIGS. 18A and B), it is possible for a user to correct the visual aesthetic from the first access point (i.e., virtually from a website rather than physically going to the site and re-adjusting aiming of the camera). The second access point could exist on a different platform than the first access point (e.g., a dedicated touchpad rather than a website). Content could be viewed live, be recorded, be available for purchase, or the like. User interface 6000 could have features different from those described herein (e.g., ability to access additional content after watching advertisements) or be operated/accessed differently from that described herein (e.g., accessed on a phone and operated by finger swipe). All of the aforementioned are possible, and envisioned.

What is claimed is:

1. A method of aiming, wiring, and commissioning a capture device that has at least one content capture direction comprising:
   a. identifying a location of interest at a site;
   b. performing a site characterization to determine one or more site characteristics;
   c. selecting a capture device adapted to capture content from the at least one content capture direction relating to said location of interest;
   d. mounting said capture device in an enclosure;
   e. mounting a laser aiming assembly to said enclosure in a known relationship to the mounted capture device in the enclosure; and
   f. final commissioning said mounted capture device, at least in part, in accordance with determinations from the site characterization by aiming the enclosure with the laser aiming assembly to an aiming point related to the location of interest which also aims the at least one content capture direction of the capture device to the location of interest at the site.

2. The method of claim 1 further comprising:
   a. partially pre-aiming of the capture device mounted in the enclosure to the content capture direction before final commissioning.

3. The method of claim 1 wherein the step of partially pre-aiming said capture device comprises aiming said capture device to one or more points on a test grid or wall in a known relationship to a test jig.

4. The method of claim 3 wherein the step of pre-aiming of said mounted capture device comprises aiming in three planes.

5. The method of claim 2 further comprising:
   a. shipping the enclosure with capture device to the site;
   b. mounting the enclosure to a mounting structure at the site;
   c. removing at least a portion of the modular enclosure;
   d. energizing the laser aiming assembly;
   e. adjusting the modular structure until a laser beam of the laser aiming assembly is correlated to a feature of the site; and
   f. replacing the modular enclosure.

6. The method of claim 2 further comprising partial pre-commissioning of said capture device comprising:
   a. configuring said mounted capture device to transmit content to an access point; and
   b. creating user credentials to access said transmitted content via said access point upon entry of said credentials.

7. The method of claim 6 wherein said access point comprises any of:
   a. a widget embedded in a website;
   b. a website; and
   c. a local network at the site.

8. The method of claim 6 further comprising creating additional user credentials to provide varying degrees of access to said transmitted content.

9. A capture and distribution system comprising:
   a. an enclosure having an interior space containing:
      i. a capture device having at least one content capture direction; and
   b. a laser aiming assembly mounted to a portion of said enclosure in a known relationship to the mounted capture device in the enclosure;
   c. so that when installed in position relative a site, aiming the enclosure with the laser aiming assembly to an aiming point related to a location of interest at the site also aims the at least one content capture direction of the capture device to the location of interest at the site.

10. The system of claim 9 further comprising:
    a. an apparatus in the modular enclosure adapted to pre-aim said capture device in a first plane when at least a portion of the enclosure is placed in a test jig.

11. The system of claim 10 further comprising:
    a. a second apparatus in the enclosure adapted to pre-aim said capture device in a second plane when at least a portion of the enclosure is placed in the test jig.

12. The system of claim 9 further comprising:
    a. a device adapted to transmit or aid in transmitting content from said capture device to an access point; and
    b. a power supply.

13. The system of claim 9 wherein the enclosure further comprises:
    a. one or more strengthening ribs; and
    b. a front and back clamshell each of which is removably attached to said strengthening ribs.

14. The system of claim 12 wherein the device adapted to transmit or aid in transmitting content from said capture device to an access point comprises a cellular antenna.

15. The system of claim 14 further comprising a top cover adapted to conceal said cellular antenna without impacting a performance of said cellular antenna.

16. The system of claim 9 further comprising:
    a. a radio operatively connected to the capture device; and
    b. a shell adapted to conceal said radio without adversely impacting a transmission of said radio.

17. The system of claim 16 further comprising:
    a. a bracketing system for mounting the enclosure; and
    b. a bracketing system for mounting the radio.

18. The system of claim 16 further comprising structure to mount the enclosure to:
    a. a freestanding pole;
    b. a backstop;
    c. a fence; or
    d. a mesh net.

19. The system of claim 13 wherein the front and back clamshells are formed from impact resistant material.

20. The system of claim 9 wherein the capture device comprises a camera with an impact resistant lens cover.

* * * * *